United States Patent
Keskitalo et al.

(10) Patent No.: US 10,540,266 B2
(45) Date of Patent: Jan. 21, 2020

(54) METHOD AND SYSTEM FOR TESTING SOFTWARE BASED SYSTEM

(71) Applicant: Profilence Oy, Oulu (FI)

(72) Inventors: Mikko Keskitalo, Oulu (FI); Mika Mikkelä, Oulu (FI); Sami Utriainen, Oulu (FI)

(73) Assignee: PROFILENCE OY, Oulu (FI)

( * ) Notice: Subject to any disclaimer, the term of this patent is extended or adjusted under 35 U.S.C. 154(b) by 159 days.

(21) Appl. No.: 15/712,215

(22) Filed: Sep. 22, 2017

(65) Prior Publication Data

US 2018/0089071 A1 Mar. 29, 2018

Related U.S. Application Data

(60) Provisional application No. 62/400,183, filed on Sep. 27, 2016.

(51) Int. Cl.
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 2004/0068395 A1* | 4/2004 | Hady | ................. | G06F 11/3409 702/188 |
| 2008/0229288 A1* | 9/2008 | Nelson | ............... | G06F 11/3636 717/127 |
| 2008/0320462 A1* | 12/2008 | Bergman | ........... | G06F 9/45512 717/168 |
| 2009/0249284 A1* | 10/2009 | Antosz | ..................... | G06F 8/10 717/104 |
| 2010/0192220 A1* | 7/2010 | Heizmann | ........... | G06F 11/3664 726/19 |
| 2011/0154296 A1* | 6/2011 | Marenco | ............. | G06F 11/3636 717/128 |
| 2015/0378875 A1* | 12/2015 | Sivanesan | .......... | G06F 11/3684 717/124 |
| 2016/0277257 A1* | 9/2016 | Addleman | .......... | G06F 11/3466 |

* cited by examiner

*Primary Examiner* — Daxin Wu
(74) *Attorney, Agent, or Firm* — Ziegler IP Law Group, LLC

(57) ABSTRACT

A method and a system for testing a software based system. The method includes collecting data from the software based system under test by a first data processing device; virtualizing and timestamping the collected data by the first data processing device; abstracting data storage type and data storage location of the collected data by the first data processing device; broadcasting the virtualized and timestamped data to at least one second data processing device; reacting to the collected data at its location with an action carried out locally by the first data processing device or by sending communication pertaining to the action to the first data processing device from the at least one second data processing device; and updating execution of the test based upon the action.

18 Claims, 15 Drawing Sheets

1300

| Test Run Explorer | Device Log | | |
|---|---|---|---|
| | ID | Timestamp | Source |
| Test Sets | 3744186 | 01.01.2017 07:30:49.456 | Main |
| Test Results | 3744187 | 01.01.2017 07:30:49.456 | Events |
| Test Run Reports | 3744188 | 01.01.2017 07:30:49.457 | Events |
| Screen Contents History | 3744189 | 01.01.2017 07:30:49.457 | Events |
| Alerts | | | |
| Execution Log | 3744190 | 01.01.2017 07:30:49.457 | Main |
| Device Log | 3744191 | 01.01.2017 07:30:49.458 | Main |
| Device Processes | | | |
| System Charts | Execution Log | | |
| Device Resets | ID | Timestamp | Description |
| Battery Stats | 224101 | 01.01.2017 07:30:40.981 | input.text('A') |
| Video | 224102 | 01.01.2017 07:30:43.724 | wait(1000) |
| | 224103 | 01.01.2017 07:30:49.675 | get.text() |
| | 224104 | 01.01.2017 07:30:49.718 | tap.text('Y') |
| | 224105 | 01.01.2017 07:30:50.691 | wait(500) |

Video

□ 54%  7:30 AM

Share as attachment via:

| Test Run Explorer | Alerts |
|---|---|
| Test Sets<br>Test Results<br>Test Run Reports<br>Screen Contents History<br>Alerts<br>Execution Log<br>Device Log<br>Device Processes<br>System Charts<br>Device Resets<br>Battery Stats<br>Video | • 145 warnings in Application 'X'<br>• Device has never used the lowest CPU state (307MHz) in 120h 13m 23s time period<br>• Possible view leak in Application 'X'<br>• Possible memory leak in Application 'X'<br>• 2 warnings in Application 'P' where on average 30 frames were skipped.<br>• Possible view leak in Application 'Q'<br>• 3 warnings in Application 'Q' where on average 25 frames were skipped.<br>• 1 warning in Application 'L' where on average 12 frames were skipped.<br>• 1 warnings in Application 'S' where on average 18 frames were skipped.<br>• 4 warnings in Application 'L' where on average 2 frames were skipped.<br>• Possible memory leak in Application 'R'<br>• 69 warnings in Application 'R' where on average 75 frames were skipped.<br>• 4 warnings in Application 'P' where on average 60 frames were skipped.<br>• Possible memory leak in Application 'P'<br>• Possible memory leak in Application 'R'<br>• 2 warnings in Application 'M' where on average 22 frames were skipped.<br>• 1 warning in Application 'L' where on average 53 frames were skipped. |

METHOD AND SYSTEM FOR TESTING SOFTWARE BASED SYSTEM

TECHNICAL FIELD

The present disclosure relates generally to testing of software based systems; and more specifically, to method and system for testing a software based systems.

BACKGROUND

For software development, regardless of the team size, the majority of research and development (R&D) time and costs are spent in testing and problems solving phases. Even if there is multitude of solutions available for automating test execution for majority of software platforms; there is no solution which automates and speeds up collection and analysis phases for the data, which can be generated during the test execution.

For example, in testing tools depending on space and a platform (e.g. Android, Windows, iOS) of interest, there are plenty of test automation and/or analysis/profiling solutions available, either commercial or open source based. Typically, these solutions are dedicated to single, small purpose, example, due to technical limitations, most of the test automation solutions are for testing a single application or code component; not the entire system. Furthermore, these test automation solutions provide a technology to automate only the test execution part, usually, the only data received from the tests is pass/fail (result). In some cases, in case of a failure, a stack trace with a limited stack depth. On the other hand, the existing analysis/profiling solutions are usually dedicated to provide help for a specific area, such as memory leak analyzer. Furthermore, analysis/profiling solutions are totally decoupled from test automation solutions, i.e. they require a user to manually record the data for analysis. Still further, they are not designed to handle large amount of data, for example, Android device can easily generate a gigabyte of data per hour, and a long test round might last hundreds of hours.

Further, existing test automation solutions are not designed for long lasting test executions. For example stability testing might require hundreds of hours of testing for software based system (or device), which is close to its sales. In such instance, most of the existing test automation solutions are not reliable and/or flexible enough for this kind of requirements. Moreover, especially with mobile/embedded devices, test automation tool/runner is quite often running inside the device (or system) under test itself. With this approach the overall test run might not be able to recover and continue testing after the system under test hangs or crashes. Another significant limitations with this approach is the data collection, i.e. if possible at all, data can be collected only to internal storage of the device, or to removable data storage (such as memory card); and fetched out from the device afterwards.

The combinations of existing solutions can be used, for example, run data collector scripts parallel with a test automation tool to get the needed data, and once all the data is available, run corresponding parsers and visualizers for each data type. When combining the complexity of all this to the fact that none of this is designed for long (can be hundreds of hours) test executions and for the huge amount of data is produces, it can be said to be impossible or at least extremely difficult to achieve the needed result (or efficiency). Some test automation tools provide primitive data collection mechanisms for few data types, but usually the technique is a built-in script which uses another tool, and thus the result, when considering efficiency, is the same as described above.

Furthermore, by generating data like described above, the data does not get synchronized in time. Some raw data formats has timestamps for data points, some does not; for those who has, the time stamp source might vary. For example, when testing an Android device, the seed for time stamps might be personal computer (PC associated with a test engineer/operator), kernel boot time, or android boot time; time precision might be in nanoseconds or in minutes. Unsynchronized data requires the person analyzing the data first of all, in the worst case, to open each type of data in a separate visualizer application, but also to manually synchronize the data between each other. For example, if a system engineer detects weird behavior in test execution video, and needs to know the lines in device (or system under test) log exactly at point of time. The video duration is relative to time in PC, on which it camera is connected to, and time stamps in device log are relative in clock in the device. Further, even if clock in PC and the device could be synchronized, the synchronization accuracy would be insufficient in most of the cases. Therefore, without interactivity between different data views, the drop in problems solving efficiency is considerable.

Generally, a common example of data logistics problem: In a test lab, one test environment finds a functional problem from a system under test. The test engineer files a bug report in which a detailed description of steps how the problem might be reproduced is provided. After the bug is filled in, at some point a system engineer is allocated to start debugging the problem and he/she notices that it requires several hours to get the system under test in the condition where it fails, and it would need several kind of debugging data from the system to pinpoint the root cause of the failure. The system engineer requests the test engineer/operator to reproduce the problem, and to collect the debugging data as well. Thereafter, the test engineer may transfer the debugging data, which might be tens of gigabytes, to a common network drive. The system engineer copies the data from the network drive to his/her PC, and starts the problems solving work. Once done, the system engineer may copy the most important subset of that data to the related bug report, and routes the bug report/ticket to a developer who is responsible of the code component where the failure happens. The developer starts work by taking local copy of the data, if it still exists in the network drive, and if notices that would need more detailed data the developer may ask more data from the system engineer and/or test engineer/operator. Finally it is again the test engineer who receives a task to reproduce the problem with more detailed debug data, and copy the data to a common network drive, from where the developer and/or the system engineer can take their local copies of it. This loop continues, and might require several iterations and more developers, until the actual problem in the code is solved. It takes huge amount of time and effort, but also requires hundreds of gigabytes of data to be transferred back and forth.

Moreover, problems occurred in the field testing for mobile devices are usually hard to reproduce in test labs, and reproducing and gathering the needed debug data during field testing is either complex or impossible. There exist conventional methods for uploading limited data, for example, application crash information, to cloud service directly from mobile devices; but no complete solution for storing and uploading all the valuable data.

Based on above, it would be desirable to have valuable debugging data in real-time from the test runs executed for a system under test, i.e. data, which helps to pinpoint a root causes of the problems for the system under test. Since, having the data on real-time enables problems solving work to start immediately, without a need to wait for test execution to finish, which may take even weeks.

Further, it would be desirable to get real-time access to all valuable debugging data produced by the system under test with minimal amount of test repetition, i.e. without a need to manually request, access and transfer the data from a test environment (system, e.g. PC, running the tests) without human interaction. The repetition of a test scenario can easily double the time spend for testing. Furthermore, without a real-time data broadcasting channel, time, effort and storage spent for transferring the needed data from person to person can be huge.

Additionally, it would be desirable to get all the data synchronized and unified: in order to quickly navigate and synchronize different data streams in time, within single viewer/analyzer application. Since, without unified and synchronized data formats, person analyzing the data needs to manually synchronize the data streams, and in worst case use different data viewers for each stream. This may take lot of time and effort, and still may be error prone and inaccurate.

Furthermore, it would be desirable to get the test system to automatically react and alarm on anomalies it detects on a system under test. The reactivity in test framework enables to dynamically start collecting more detailed data from the system under test, which decreases the need for repeating the test scenario with manually enabled data collectors. The reactive notifications enable engineers to automatically start the problem solving work, without a need to actively monitor the test run and data under interest.

Still further, it would be desirable to share any findings from the data with anyone having the access to the same data. It may save lot of time and effort if interactive links/bookmarks to exact location in the data could be shared; without transferring the complete data itself, and without a need to manually navigate to the correct location(s) in data(s) once receiving the data.

Moreover, it would be desirable to have a data viewer application, whose performance and response times remain in good level regardless of sizes of the data streams. As, the data streams even with the simplest, textual, format might get big, for example, even hundreds of gigabytes. Further, for many data stream types, there is no visualizer application at all, or exiting applications can't handle streams of big size, i.e. they either run out of memory or lose the responsiveness.

As mentioned above, test automation execution is traditionally coded in sequence of steps and each step can either pass or fail, for example, cause current test case execution to fail. Further, various systems which are automatically tested consist of many occasions that are not related to test case under execution and therefore can interrupt the test case flow. These situations are traditionally handled with if-else logic. However, as the tested systems have increasingly unexpected situations that can occur, this traditional way becomes harder to implement and maintain. Also there might be interruptions from other systems or for example notifications from different applications on the tested system that could prevent execution of the pre-written script or code.

For example, traditionally test code or test scripts have been written with if-else logic to overcome situations that may happen during the execution. If-else logic is not an effective way to handle situations that might happen non-deterministic during test case execution. Further, reactive programming approach has not been used in other test automation systems. Some tools allow launching of certain scripts for cleaning up the tested systems state after a failure has happened in the test case execution, but this just an implementation of if-else logic.

Furthermore, state analysis in object recognition based test automation tools has traditionally been using the XML representation of the user interface (UI) on the device screen. An XPath is well known method to analyze the content of the XML document. There is no known implementation where XML and XPath or similar (JSON etc.) approach would have been used in checking the conditions when the UI state changes. The XPath is not ideal way since it is constructed with a query string and complex queries tend to be cumbersome to update and maintain.

In addition to above, test specification describes how a functionality may be tested. The test specification defines the input and expected output in the system under test. In test automation, this specification is scripted or programmed with scripting library calls specific to test automation framework, and the result of the test execution is determined within the scripting library and test framework. When there's different kind of systems under test and same test specifications is used to test each system, test automation scripts might not work since the different systems require different kind of inputs to reach expected output. Thus, the test scripts need to have multiple versions for each system under test. This creates maintenance need, i.e. when a test script needs to be changed in some way the change needs to be replicated in each version of the script available.

A solution to aforementioned problem may be keyword or action based test automation to quickly adapt to changes in the tested system. For example, if the same keyword or action is used in various test scripts, then the changes in the keyword or action will be replicated to all test scripts. However, there is no method existing in the field of test automation that can override the defined scripting library methods (e.g. keywords) by automatically selecting a location of the overrides.

Additionally, the system or (device under test) may freeze (or its UI may freeze) in a situation when a user controlled system stops responding to user interactions with UI. For example, if the user controlled system includes a display, the display or touch/user input module might stop functioning while the software layer is still working. The UI freezes are the most fatal errors from end user point of view since the only way to recover from it is to reboot the device. Further, such type of errors are often hard to debug and repeat in the testing process. For example, when software is tested by recognizing objects from the software level, this type of errors are hard to detect since the test verification relies on the information received from the system under testing and tests can be conducted without physically interacting with the device. Therefore, UI test automation methods that work with bitmap captured from system under test (via system software) or software object recognition do not have a method to detect the described freeze situations automatically.

Therefore, in light of the foregoing discussion, there exists a need to overcome the aforementioned drawbacks of conventional testing methods and systems for software based systems.

SUMMARY

The present disclosure seeks to provide a method for testing a software based system.

The present disclosure seeks to provide a system for testing a software based system.

In one aspect, an embodiment of the present disclosure provides a method for testing a software based system, the method comprising:

collecting data from the software based system under test by a first data processing device;

virtualizing and timestamping the collected data by the first data processing device;

abstracting data storage type and data storage location of the collected data by the first data processing device;

broadcasting the virtualized and timestamped data to at least one second data processing device;

reacting to the collected data at its location with an action carried out locally by the first data processing device or by sending communication pertaining to the action to the first data processing device from the at least one second data processing device;

updating execution of the test based upon the action.

In the aforesaid method, data from the software based system under test can be optionally collected by the first data processing device in form of data structures like link list, tree, heap and so forth. Furthermore, virtualization relates to organizing the collected for the access of end user associated with the first data processing device. Optionally, the end user can be a test engineer associated with the software based system under test. Moreover, abstracting relates to masking (namely hiding) information such as data storage type, data storage location and so forth which may not be important to the test engineer. Additionally, optionally, broadcasting of virtualized data can be done via wired or wireless media. More optionally, reacting to the collected data can be performed by means of function calls, loading libraries and so forth. Furthermore, updating of test execution removes anomalies of test execution and optimizes the software based system testing.

Optionally, the virtualization of the collected data comprises indexing the collected data.

Optionally, in this regard indexing can be dense, sparse, clustered, non-clustered and so forth.

Optionally, the broadcasting may comprise at least one of sending the virtualized and timestamped data using multicast protocols to the at least one second data processing device, sending uniform resource locator related to the virtualized and timestamped data to least one second data processing device.

Optionally, in this regard, at least one of the multicast protocols and uniform resource locator can be employed based upon the state of the software based system under test.

Optionally, a data view on a data processing device, having data items, when clicked, sends a timestamp associated with clicked data to at least one other data view on the same data processing device.

Optionally, in this regard, the timestamp is sent to at least one data view in order to synchronize all related data views.

Optionally, the method further comprises receiving data from the software based system when the data is collected by the first data processing device, and reacting, based on the received data, at its location, when the received data matches a predefined conditions, by the at least one second data processing device.

Optionally, in this regard, predefined if-else conditions are matched and reacting to the received data relates to execution of action associated with the condition.

Optionally, the collected data is automatically compared, by the first data processing device and/or by a server, to previously collected data or pre-defined threshold values and wherein the reaction based on the observed comparison result obtained comprises the action to be executed by the first data processing device and/or the server.

Optionally, in such a case, comparison of the collected data is carried out by observing changes between two states of the software based system under test.

Optionally, the method further comprises the reaction based on the received data comprises an action to be executed by the at least one second data processing device.

Optionally, in such a case, action can be a function call, executing a library and so forth.

Optionally, a test framework is capable of reacting to an observed state with predefined logic when the observed state contains predefined properties.

Optionally, in such a case, the predefined logic can be a test condition.

Optionally, the method further comprises the reacting based on the observed state comprises the action to be executed by the first data processing device.

Optionally, the method further comprises defining, extending and overriding a scripting library, to conduct actions on the software based system.

Optionally, the method further comprises selecting a location of the scripting library definitions, extensions and overrides automatically or manually.

Optionally, in this regard, a configuration of the scripting library is defined in a manner that by reading properties of the scripting library and comparing them to properties read from system under test, the location of the scripting library definitions, extensions and overrides are determined.

Optionally, the method further comprises capturing a video, of the software based system, for identifying a freeze condition of the software based system.

Optionally, in such a case, the video comprises video frames depicting screenshots of the software based system under test. Moreover, the video can be helpful in determining state of the software based system at any specific instant of time during testing.

Optionally, the identification of the freeze condition is determined by analyzing video frames of the software based system.

Optionally, in such a case, at least two video frames of the software based system under test are compared to identify the freeze condition in the software based system. Specifically, in a case wherein the at least two video frames being compared are identical (namely, the at least two video frames depict a same state of the software based system under test), a freeze condition is identified. Alternatively, when the at least two video frames being compared are different from each other (namely, the at least two video frames depict different states of the software based system under test), an absence of freeze condition is identified.

In another aspect, an embodiment of the present disclosure provides a system for testing a software based system, the system comprising:

a first data processing device configured to collect data associated with the software based system under test;

virtualize and timestamp the collected data abstract data storage type and data storage location of the collected data;

broadcast the virtualized and timestamped data to at least one second data processing device; and the at least one second data processing device communicably coupled to the first data processing device;

wherein the first data processing device is configured to react to the collected data at its location with an action carried out locally or the at least one second data processing device is configured to send communication pertaining to the action to the first data processing device, and wherein the first data processing device and/or the at least one second data processing device is configured to update execution of the test based upon the action.

In the aforesaid system, the first data processing device could be communicably coupled to the software based system in a wired and/or a wireless manner. Furthermore, a platform hosted on the first data processing device facilitates the testing of the software based system as described herein. As an example, a data collector interface of the platform fetches data from the software based system under test, and timestamps the collected data. Furthermore, in such a case, a data virtualization library of the platform could be employed for virtualization of the collected data. The first data processing device comprises a data storage abstraction layer that allows for abstracting (namely, hiding or obscuring) data storage type and data storage location of the collected data. Consequently, the virtualized and timestamped data is broadcast to the at least one second data processing device by suitable communication media.

Optionally, the system comprises a server communicably coupled to the first data processing device and the at least one second data processing device, wherein the server is configured to collect the virtualized and timestamped data transmitted from the first data processing device, and transmit the virtualized and timestamped data to the at least one second data processing device.

Optionally, in this regard, the server acts as an interface between the first data processing device and the at least one second data processing device. In other words, the server is operable to transmit the virtualized and timestamped data transmitted from the first data processing device to the at least one second data processing device.

Optionally, the server comprises a database, and wherein the database is configured to store the virtualized and timestamped data.

Optionally, in this regard, storing the virtualized and timestamped data at the database allows for implementing automatic comparison of data from different test runs, which consequently, improves testing of the software based system. Furthermore, the stored virtualized and timestamped data at the database reflects behavior and trends of non-functional parameters and the overall stability of the software based system under test, over a period of time.

Optionally, the server is configured to react to the collected data at its location by way of executing the action.

Optionally, in this regard, the server could optionally execute a pre-written script or code, which consist of test steps required to test a particular test case, wherein such a pre-written script or code operates on the collected data at its location.

Embodiments of the present disclosure substantially eliminate or at least partially address the aforementioned problems in the prior art, and enables efficient testing of a software based system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 13-15 are exemplary illustrations of device observer interfaces provided on the first processing device, in accordance with an embodiment of the present disclosure.

Figure 1:
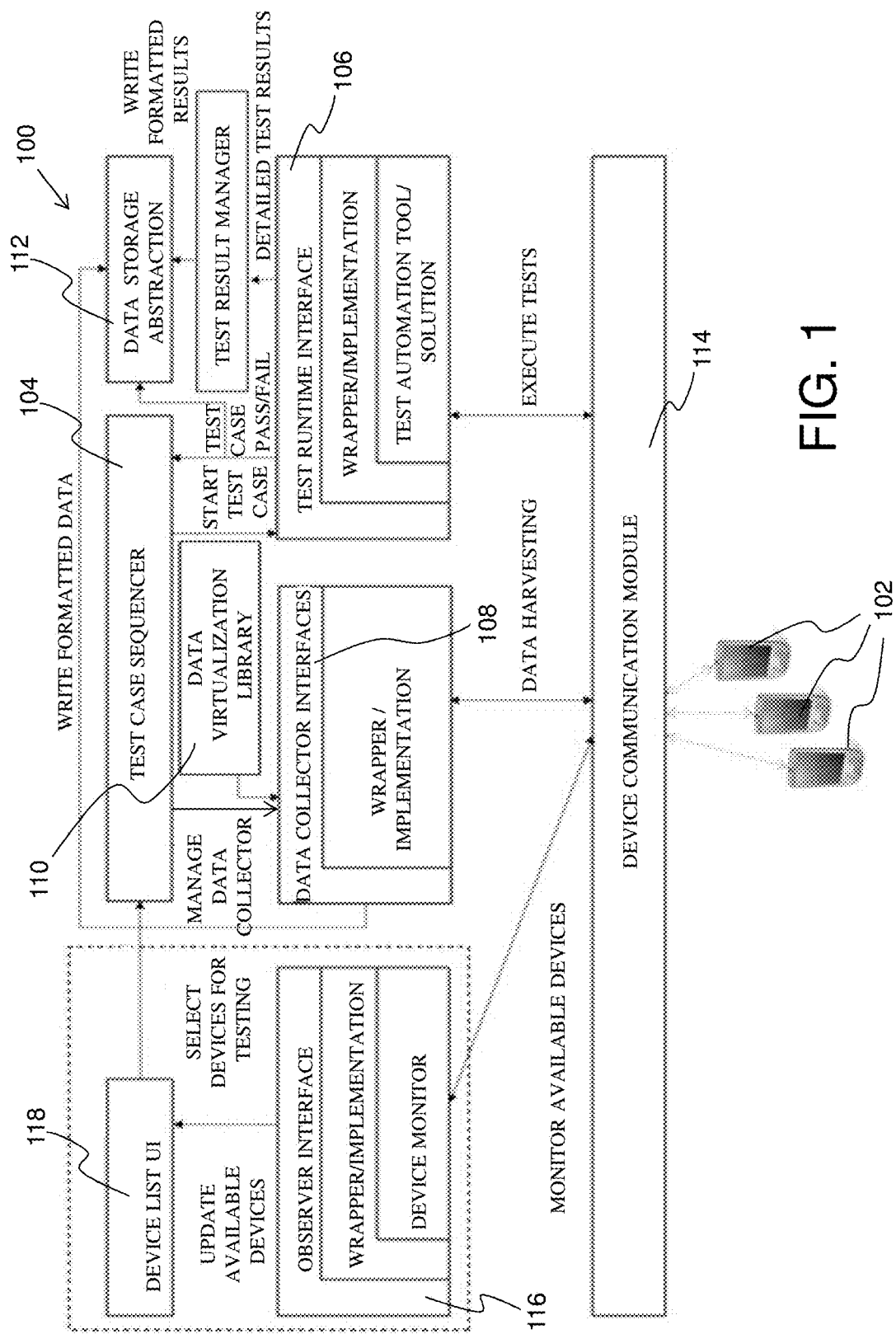
FIG. 1 illustrates an example platform for testing a software based system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

In one aspect, an embodiment of the present disclosure provides a method for testing a software based system, the method comprising:
  collecting data from the software based system by a first data processing device;
  virtualizing and timestamping the collected data by the first data processing device;
  abstracting data storage type and data storage location of the collected data by the first data processing device;
  broadcasting the virtualized and timestamped data to at least one second data processing device; and
  reacting to the collected data at its location with an action carried out locally by the first data processing device or by sending communication pertaining to the action to the first data processing device from the at least one second data processing device; and
  updating execution of the test based upon the action.

In another aspect, an embodiment of the present disclosure provides a system for testing a software based system, the system comprising:
  a first data processing device configured to
    collect data associated with the software based system under test;
    virtualize and timestamp the collected data;
    abstract data storage type and data storage location of the collected data;
    broadcast the virtualized and timestamped data to at least one second data processing device; and
  the at least one second data processing device communicably coupled to the first data processing device;
  wherein the first data processing device is configured to react to the collected data at its location with an action carried out locally or the at least one second data processing device is configured to send communication pertaining to the action to the first data processing device, and wherein the first data processing device and/or the at least one second data processing device is configured to update execution of the test based upon the action.

In one embodiment, the present disclosure enables in automatic data collection from device under test (DUT), virtualize the data, and make it synchronizable with other data streams, shareable (either real-time or on-demand) via server, accessible via hyperlinks. Further, in the present disclosure real-time data is compared with stored data in order to provide reactivity for test executions. Moreover, the present disclosure provides robustness to test execution, i.e. long term data collection by wrapping an actual test runtime implementation in fault-tolerant manner.

Referring now to FIG. 1, illustrated is a platform 100 for testing a software based system 102 (or a device under test i.e. DUT), in accordance with an embodiment of the present disclosure. The platform 100 of the present disclosure enables in retrieving all valuable trace and debugging data from the device 102, and makes it visible and shareable on real-time, synchronized and seekable in time, and virtualized (namely, indexed) for fast and lightweight navigation from a viewer UI. The platform 100 also enables in storing all the data to a reactive, real-time database, which enables attended and/or automatic comparison of data from different test runs. Furthermore, automatic data comparison enables reactive behavior when anomalies are detected. For example sending an automatic notification for engineer(s) or sending a callback to test case sequencer 104 in the first data processing device when a specific behavior is detected. In an embodiment, the device 102 may be a mobile phone, computer, wearable electronic, tablet, car, camera, television, or a single application like a web browser, i.e. anything which can be tested with software.

In an embodiment, the platform 100 may be implemented in a first data processing device (a testing computer, shown and explained in subsequent figures) for collecting data associated with the software based system 102. The first data processing device is associated with a test engineer responsible for testing the device 102. The collected data is virtualized and broadcasted by the first data processing device. Thereafter, at least one second data processing device (shown and explained in subsequent figures) receives the broadcasted virtualized data from the first data processing device. The second data processing device is associated with a system engineer or a developer.

As shown, the platform 100 includes a test runtime interface 106 for adapting any test automation tool/framework for executing the actual test cases, and steps. Test case sequencer 104 scheduled test cases for the test runtime interface. For example, by implementing test case parser interface, test cases from any source (usually file), can be provided as a collection of compatible test case instance for the test case sequencer 104. Further, by implementing test runtime interface 106, any test execution tool/framework becomes compatible test case runner for the test case sequencer 104 of a test execution library. In an embodiment, the test case sequencer 104 is a generic component, which takes abstract test case classes as an input (provided by test case parser implementation), and sequences tests to the test runtime interface 106 (implementation of test runtime interface). For example, at least, a runtime implementation consists of a channel to start a test case instance with optional parameters. Optionally, the integration implements a logging mechanism where its progress and output are passed to the main framework. Also optionally, the integration implements a callback channel for test results the integrated test tool provides.

In one embodiment, the platform 100 also includes a data collector interface 108 which is implemented for each data type and for each type of system (or device, such as the device 102) under test. The implementation is responsible of fetching the specific data from the device 102 via any technique feasible for the device 102. The data collector interface 108 is responsible for adding time stamps to the collected data. Thereafter, format the data by using a data virtualization library 110, and to write the data to storage via a data storage abstraction layer 112. In other words, the data virtualization library 110 is responsible for indexing the collected data, and the data storage abstraction layer is responsible for hiding the data location details from data readers and data writers. In an embodiment, the data virtualizaton library 110 is a generic library for making any data types virtualizable, i.e. headered and indexed with unlimited layers. Therefore, optionally, the virtualization of the collected data comprises indexing the collected data. The default data type in data header is time stamp, which is not mandatory to virtualize the data itself, but to make the data synchronizable. Further, with data virtualization, the data header provides the needed information to visualize the mandatory information of the data, example a thumbnail of an actual image. Moreover, index and/or timestamp in a data header points to actual data, for example an actual image, in the data store, or to header in next virtualization layer. Therefore, when querying the data, the queries use the headers, usually indexes or timestamps, to fetch only the needed part(s) of the data.

In an embodiment, the data collectors can be polling or pushing based, i.e. both need to implement different type of base collector interface. For example, with polling based collectors, the collector's fetch-implementation is invoked in intervals, which is specific for each collector. Further, with pushing based collectors, the data is being continuously streamed/pushed from device under test 102 to the data collector (such as the first data processing device). The test case sequencer 104 is responsible for starting, suspending, resuming, and disposing all the collectors within test set execution.

Further, in FIG. 1, shown is a device communication module 114, which enables the first data processing device to collect data from the device 102, via a wrapper implementation. Optionally, provided is a device observer interface 116 and a device list UI 118 via which a user can select DUT's for testing.

Figure 2:
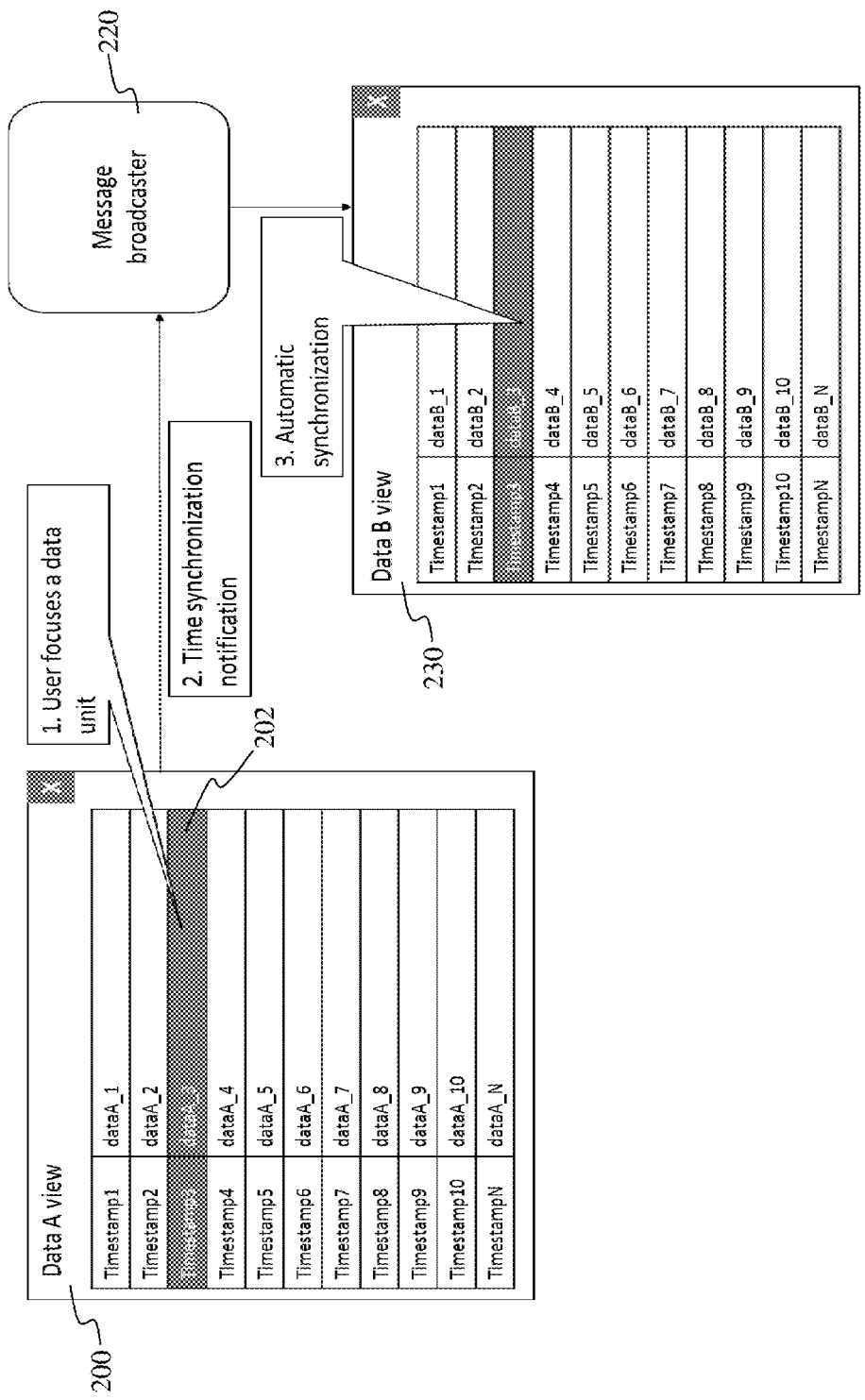
FIG. 2 illustrates time based data synchronization mechanism between data views within a single data processing device.

Referring now to FIG. 2, illustrated is an example Data A view 200 to be provided on a data processing device, in accordance with an embodiment of the present disclosure. Data A view 200 on the data processing device having data items 202, when clicked, sends a timestamp associated with clicked data to at least one other data view 230 on the same data processing device, for example, via local message broadcaster channel 220.

In the present disclosure, the data collectors 108 timestamp all the data, and data headers are created by using the data virtualization library 110. As shown, when a data item 202 is clicked on the Data A view 200 (in a viewer provided by a data processing device), its timestamp is broadcasted via a local message broadcaster 220 to all other to data views 306 within the same data processing device. This allows other data views 306 to find a data item closest to received time stamp (associated with the data item 202 clicked on the Data A view 200), and further allows automatic scrolling of the viewer to that data point.

In an embodiment, the uniform resource locators (URLs) or data bookmarks are specific to timestamp in the data produced from a test run. The URL can be input via the graphical user interface (GUI), such that when clicking a URL hyperlink via any text visualizer (example email client), the GUI is launched if not already running and the data described in the URL will be fetched and focused to desired point in time. Further, when using a data bookmark, the corresponding data is automatically fetched either from disk or server/cloud. Moreover, all data views are automatically focused to data point closest to time timestamp in the bookmark.

Figure 3:
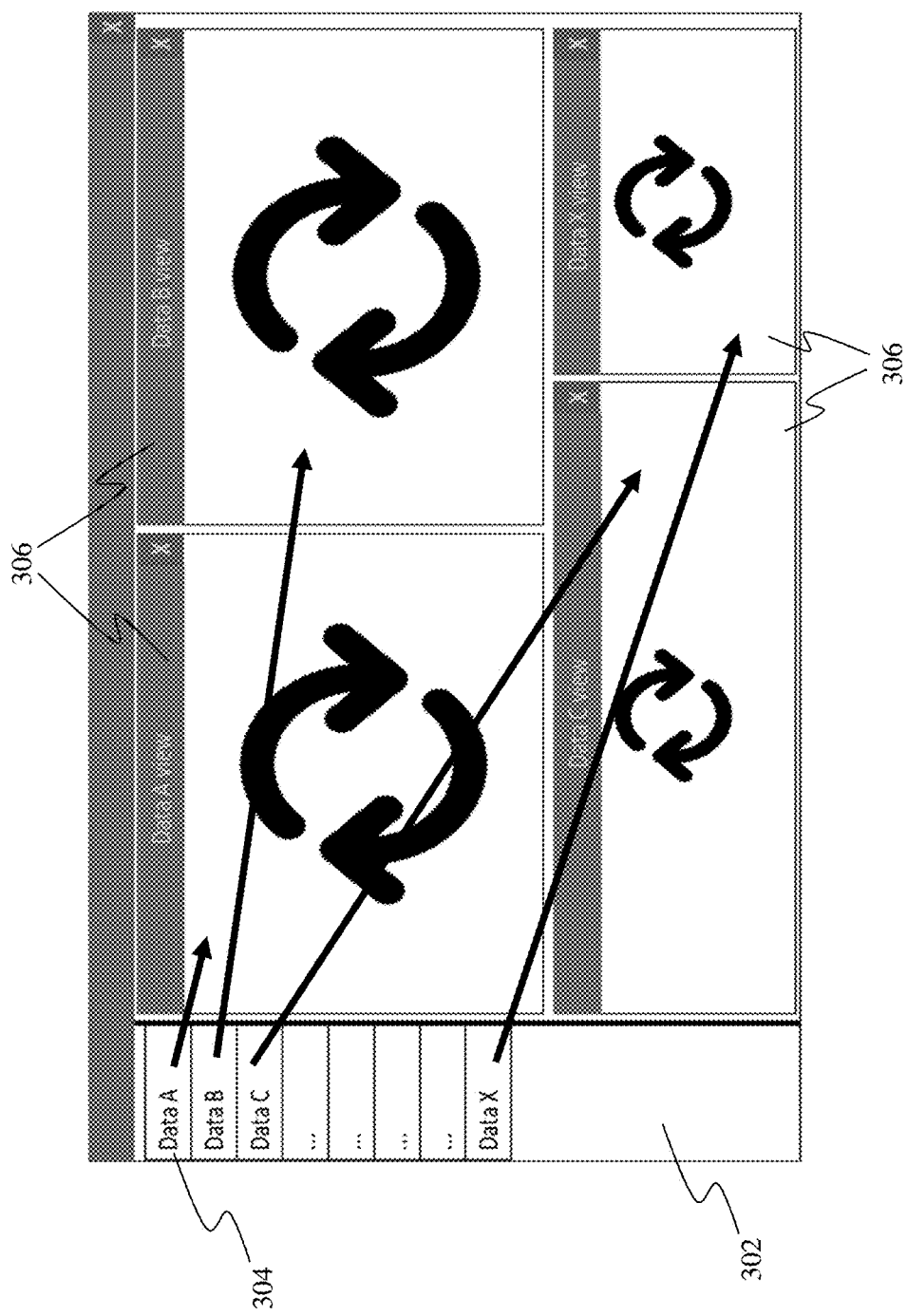
FIG. 3 illustrates a data explorer having various data types, out of which one is selected, to provide dockable window, in accordance with an embodiment of the present disclosure.

FIG. 3 illustrates a data explorer having various data types, out of which one is selected, to provide dockable window, in accordance with an embodiment of the present disclosure. This Figure also illustrates how multiple data views focuses themselves when a data point in one other view is selected. Indeed, as shown in FIG. 3, a Data explorer 302 includes various links to data types, such as a link to data type A 304, and clicking on which provides dockable windows 306 for selected data type. As shown, selection of the data type A 304, provides dockable windows 306.

Figure 4:
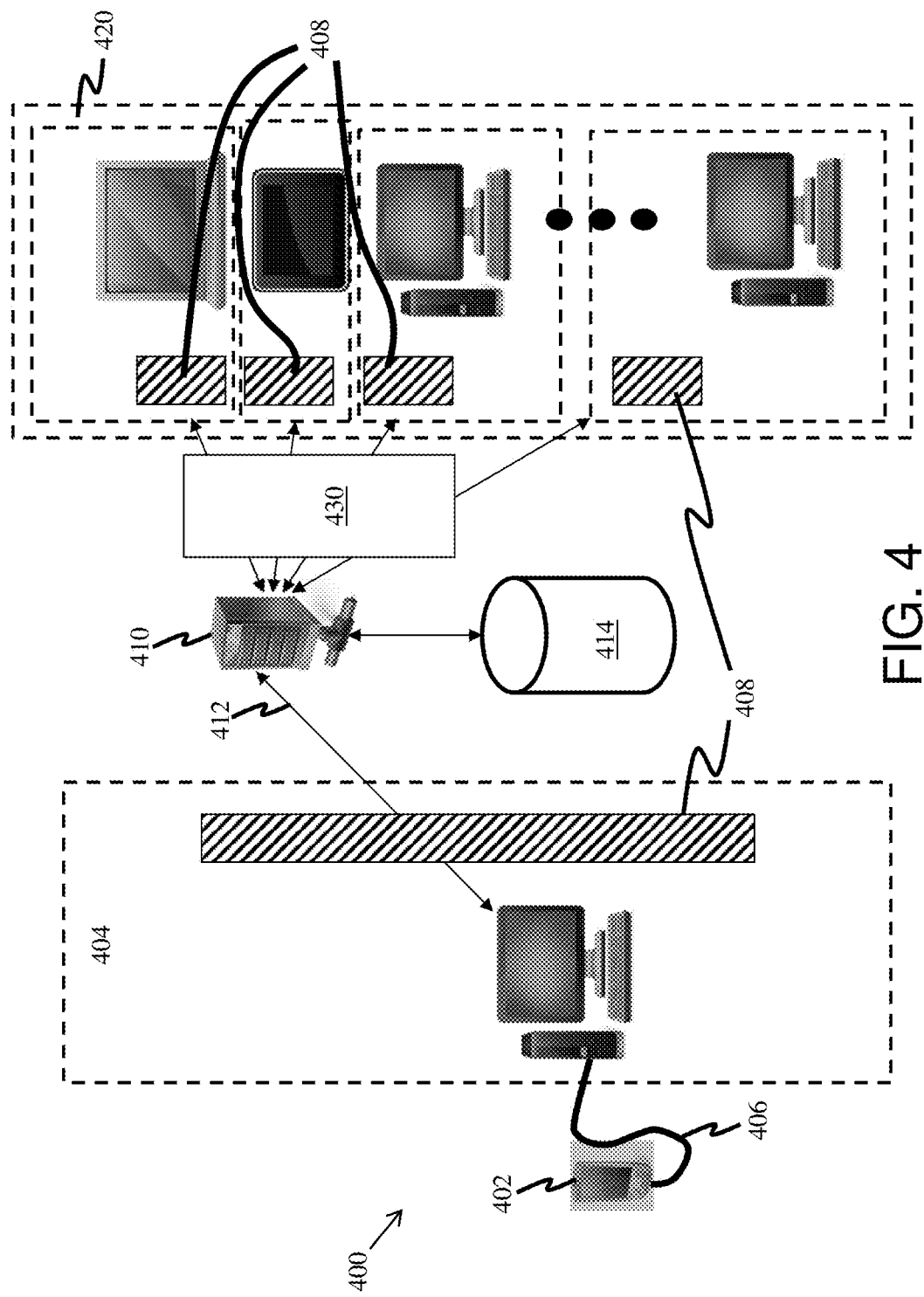
FIG. 4 illustrates broadcasting by the first data processing device, and at least one second data processing device for receiving the broadcasted virtualized data from the first data processing device.

Referring now to FIG. 4, illustrated is a system 400 for testing a software based system, in accordance with an embodiment of the present disclosure. As shown, the software based system under test 402 is operatively coupled to a first data processing device 404 (test client) via a connection media 406. Therefore, as shown, the system includes the first data processing device 404. The system 400 is shown to optionally include a server 410 communicably coupled (for example, using wired or wireless internet connection) to the first data processing device 404, wherein the server 410 is configured to collect virtualized and timestamped data 412 from the first data processing device 404, for example, via data abstraction layer 408.

Notably, the first data processing device 404 is configured to collect data associated with the software based system 402 under test, virtualize and timestamp the collected data, abstract data storage type and data storage location of the collected data, broadcast the virtualized and timestamped data 412 to at least one second data processing device 420. It will be appreciated that a platform (for example, such as the platform 100 of FIG. 1) hosted on the first data processing device 404 facilitates the testing of the software based system 402 as described herein. As an example, a data collector interface of the platform (for example, such as the data collector interface 108 of the platform 100) may allow for collecting data from the software based system 402 under test, and timestamping such collected data. In such an example, a data virtualization library of the platform (for example, such as the data virtualization library 110 of the platform 100) could be employed for virtualization of the collected data. Furthermore, a data storage abstraction layer (for example, such as the data storage abstraction layer 112) could be employed for abstracting the data storage type and the data storage location of the collected data.

Optionally, the broadcasting comprises at least one of: sending the virtualized and timestamped data using multicast protocols to the at least one second data processing device, sending uniform resource locator related to the virtualized and timestamped data to at least one second data processing device. In an embodiment, the virtualized and timestamped data is send using multicast protocols to the at least one second data processing device. Additionally, or alternatively, in another embodiment, a uniform resource locator related to the virtualized data may be send to least one second data processing device.

Furthermore, the system 400 also includes at least one second data processing device, such as second data processing devices 420 communicably coupled to the first data processing device 404. Moreover, optionally, the server 410 is communicably coupled to the at least one second data processing device 420, wherein the server 410 is configured to transmit the virtualized and timestamped data 412 to the at least one second data processing device 420.

Optionally, the server 410 comprises a database 414, wherein the database 414 is configured to store the virtualized and timestamped data 412. In other words, optionally, the virtualized and timestamped data 412 may be stored in the database 414.

Optionally, the server 410 is configured to react to the collected data at its location by way of executing the action. In such a case, the server could optionally execute a pre-written script or code, which consist of test steps required to test a particular test case, wherein such a pre-written script or code operates on the collected data at its location.

As shown, the data storage abstraction layer 112 abstracts the actual storage where the data is being written to and read from, i.e. it abstracts (namely, hides) whether data is being written/read to/from local hard disk (of the first data processing device 404) or the server 410 or cloud server, or locally and to/from remote location simultaneously. In other words, abstraction of data is performed in the software based system by hiding the data storage location and data storage types. Therefore, the term 'abstraction' used herein refers to hiding such possible non-essential data (for example, data storage location information) from users and providing a desired view of the virtualized and timestamped data. For example, the data collectors 108 of the first data processing device 404 write and the second data processing devices 420 read data through the storage abstraction layer 112 without need to know where the actual data is stored. Also, the storage abstraction layer 112 may provide live or on demand streaming of the data streams 430 to the second data processing devices 420. In the present disclosure, a data source can be progressive, i.e. a producer test run is writing at the same time when the second data processing devices 420 (consumers/viewers) are reading the data.

Furthermore, the first data processing device 404 is configured to react to the collected data at its location with an action carried out locally or the at least one second data processing device 420 is configured to send communication pertaining to the action to the first data processing device 404, and wherein the first data processing device 404 and/or the at least one second data processing device 420 is configured to update execution of the test based upon the action.

Figure 5:
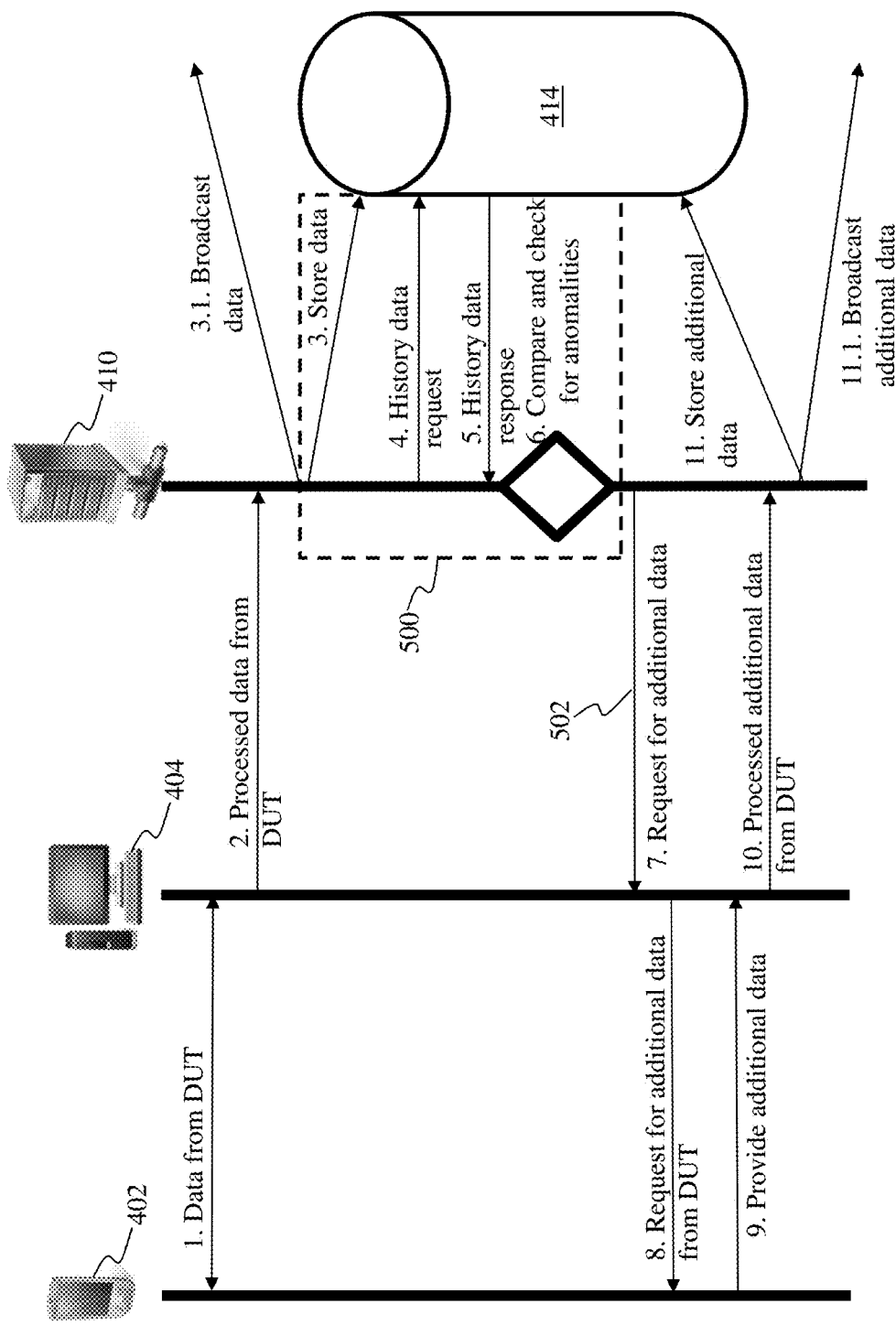
FIG. 5 illustrates an example data reactor framework associated with a system for testing a software based system, in accordance with an embodiment of the present disclosure.

Referring now to FIG. 5, illustrated is a data reactor framework 500 associated with a system (such as the system 400) for testing a software based system, in accordance with an embodiment of the present disclosure. Specifically, FIG. 5 illustrates various steps involved in a flow virtualized data (such as virtualized data 412, shown in FIG. 4) of the system 400. The data reactor framework 500 provides real-time reactivity for the data produced in a test run. For example, the data storage abstraction layer 112 (shown in FIG. 1) enables the data reactor framework 500 to be utilized regardless of where the actual reference data is stored. The data reactor framework 500 compares real-time test run data to stored test run data or stored data from different test runs, or to predefined threshold values. Further, the user (person associated with the first data processing device 404) can define conditional behavior for the data produced by device under test 402. Example condition would be to monitor if peak memory consumption with application X in OS version Y1.1 is greater than with Y1.0. Further, the user may also define a handler for that condition, i.e. for the previous example it would be a callback instruction 502 for the first data processing device 404 to provide more detailed memory information for application X (i.e. when the reference peak value is reached or exceeded). The data storage abstraction layer 112 hides the details whether the actual data comparison is processed locally or in the server/cloud machine 410. The data reactor framework 500 contains libraries, which may be utilized by users in order to create the conditions and handlers, and to deploy those in the location where the comparison takes place.

Therefore, optionally, the collected data is automatically compared, by the first data processing device 404 and/or by a server 410, to previously collected data or pre-defined threshold values and wherein the reaction based on the observed comparison result obtained comprises the action to be executed by the first data processing device 404 and/or the server 410.

Optionally, the method comprises receiving data from the software based system when the data is collected by the first data processing device, and reacting, based on the received data, at its location, when the received data matches a predefined condition, by the at least one second data processing device.

Optionally, the reaction is based on the received data comprises an action to be executed by the at least one second data processing device 420.

Furthermore, optionally, the first data processing device 404 and the server 410 could be implemented by way of a single device. Optionally, in this regard, functionality of the first data processing device 404 and the server 410 is implemented by way of separate software blocks within the single device.

In an example, most of mobile phone manufacturers execute MTBF (Mean Time Between Failure) testing for their products with test runs, which lasts hundreds of hours, the MTBF test is a common quality metric for overall product quality. The device under test in long lasting testing generates huge amounts of data, which may be 1 GB per hour. Therefore, any piece of this data can be critical when solving a problem detected during the testing. Further, in many cases different types of data is needed to understand the problem. Moreover, in long term testing a detected crash can be a result from a small memory leak, which is just too small to be noticed via short usage via device UI. The present disclosure makes all of this data visible to anyone in a R&D organization, easily and quickly accessible even in real-time. For example, even the smallest anomalies, example memory leaks, can be detected right away via data reactors. The data is already synchronized when user accesses it, i.e. if a user clicks on a crash dump of an application, which failed the test case, the user will get a memory usage chart of that application synchronized/focused on that time when the crash happened. Therefore, it becomes easy to determine whether the crash was a result of memory leak, or due to high memory usage. Further, if a data reactor for this application's memory usage was used, the user would get, example, an email notification when the first memory leak happened, i.e. in such instance the user may be able to react immediately and start fixing the problem, instead of waiting for days to be notified that the application has crashed. The data reactors may save days in development and problems solving work.

Figure 6:
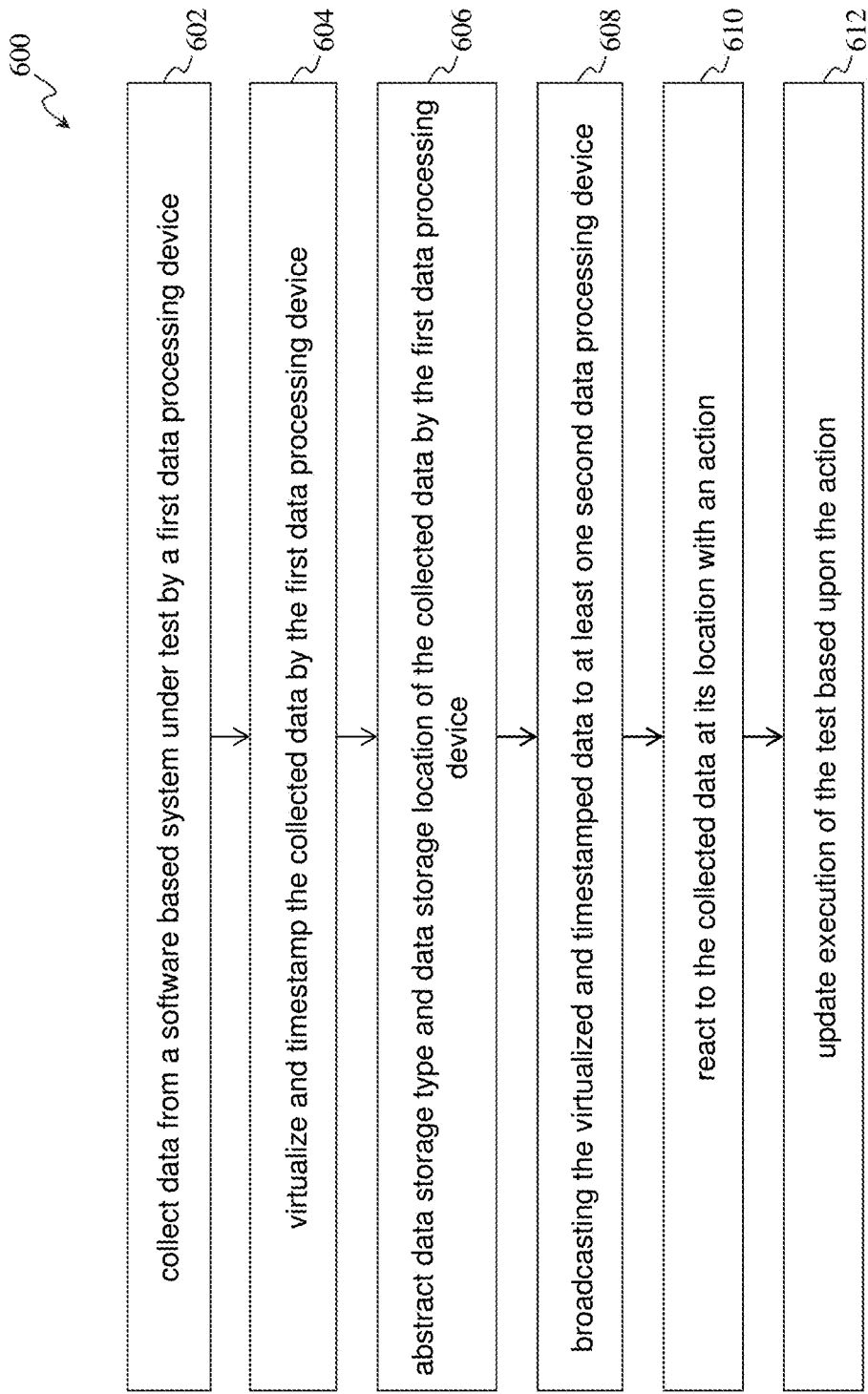
FIG. 6 is an illustration of steps of a method for automatically collecting data from a software based system under test, in accordance with an embodiment of the present disclosure.

Referring to FIG. 6, illustrated is an illustration of steps of a method 600 for automatically collecting data from a software based system under test, in accordance with an embodiment of the present disclosure.

At step 602, data from the software based system under test is collected by a first data processing device.

At step 604, the collected data is virtualized and time-stamped by the first data processing device.

At step 606, data storage type and data storage location of the collected data is abstracted by the first data processing device.

At step 608, the virtualized and timestamped data is broadcasted to at least one second data processing device.

At step 610, a reaction to the collected data is implemented at its location with an action carried out locally by the first data processing device or by sending communication pertaining to the action to the first data processing device from the at least one second data processing device.

At step 612, execution of the test is updated, based upon the action.

Further, the steps 602 to 612 are only illustrative and other alternatives can also be provided where one or more steps are added, one or more steps are removed, or one or more steps are provided in a different sequence without departing from the scope of the claims herein. For example, in the method 600, the virtualization of the collected data optionally comprises indexing the collected data. Additionally, for example, in between steps 604 and 608 the method 600 further comprises observing a state of the software based system from its data, and reacting to the collected data at its location with an action carried out locally by the entity reacting or by sending an action to the first data processing device when the entity reacting is different from the first data processing device. Further, in the method 600, the broadcasting optionally comprises one of sending the virtualized data using multicast protocols to the at least one second data processing device, and sending uniform resource locator related to the virtualized data to least one second data processing device.

The system and method of the present disclosure (described in conjunction with FIG. 1-6) provides a platform for automatically collecting data from software based systems (devices), and wrapping any test automation tool for data production. In particular, depending on the selected/wrapped test automation tool, the platform can be utilized for testing software from single code component or application to a complete system (or any device running an operating system), and for harvesting and formatting all the data a system under test. The framework provides assets for test automation tools integration, but also supports data harvesting from manual test execution. The platform harvests as much data as possible from the device under test, and provides insight into non-functional properties (such as memory and CPU usage) of the system on real-time. All the data, the framework harvests and stores, is synchronized in time. This allows browsing history data by rewinding/forwarding in time and automatically keeping all the different data parameters synchronized. The data from test execution can be stored to a real-time database (local or remote), which, over the time, reflects the behavior and trends of non-functional parameters and the overall stability of the system under test. The framework can be used to set real-time alarms about anomalies it detects in the database when new data is compared to stored history data. An alarm can trigger the test execution engine to start harvesting even more detailed and specific data from the system under test, or it can trigger an automatic notification for specific persons. All the data collected by the framework can be visualized by an efficient and flexible Graphical User Interface (GUI). The dockable windows of the GUI enable users to compose the UI to suit the task at hand. The synchronized data navigation allows user to browse history data by rewinding/forwarding in time. Interactive data views and charts provide a high level overview on trends and allow user to zoom into micro level with history data. Further, combination of the GUI and automatically stored, centralized, synchronized, and real-time broadcasted data with alarm system can significantly improve the problem solving work when anomalies in the system under test arise by minimizing the reaction time, time used for data logistics, and time used for manually synchronizing the needed crucial parts of the data. Additionally, analysis of the data can start already during testing, enabling significantly faster debugging and resolving of found bugs.

In an embodiment, the present disclosure also relates to test automation systems work by simulating an action and then observing the outcome of the action. The action is usually conducted by executing a pre-written script or code, which consist of the test steps required to test the particular test case. The outcome of each action is most often interpreted by reading state of a software based system by the means possible in given environment. This boils down to the fact that test automation systems need to observe the state in some way to make decision whether the test case or action has passed or failed. Specifically, the present disclosure relates to testing non-deterministic systems in a maintainable way by observing state of the tested system and thereafter reacting to certain states by pre-written execution logic. Specifically, the present disclosure relates to reacting to events and states during execution of automated test case. Further, time at which these events occur may be not known.

Additionally, the method 600 further comprises observing a state of the software based system when the collected data is executed by the first data processing device, and reacting based on the observed state, when the observed state matches a predefined state, by the at least one data processing device. Further, in the method 600, the reaction based on the observed state comprises an action to be executed by the at least one data processing device. Additionally, the method 600 comprises defining a scripting library, to conduct actions on the software based system, based on a parameter read from the software based system. Further, the method 600 comprises overriding an existing scripting library and creating a new scripting library. Additionally, the method 600 comprises capturing video, of the software based system, for identifying a freeze condition of the software based system. Further, in the method 600, optionally, the identification of the freeze condition is determined by analyzing video frames of the software based system.

Further, the present disclosure relates to a device, a computerized process for observing the device state and making reactivity possible in test execution. In an embodiment, when reactivity or reactive programming is applied to test automation, pre-defined (pre-written) methods are launched to overcome unexpected situations. Further, reactivity in test automation may also be used to react on situations, for example, waiting for an event to happen and launch some pre-defined action for it. This provides a way to test the non-deterministic systems in a maintainable way.

In an embodiment, the way the state is observed has impact on how the conditions are defined. If the state is observed as an XML tree, then the condition can be defined, for example, by using XPATH queries. Optionally, the present disclosure relates to abstraction of the state (or a part of it) in an observable sequences and thus makes possible to use Reactive Extensions library to react on the state changes. For example, by using .NET and Language Integrated Query (LINQ), analysis of the state and performing reactive programming in test automation can be implemented conveniently. In an embodiment, depending on the language used to create the test scripts, equivalent technology can be used. For example, RxJava for java, RxJS for JavaScript, Rx.NET for C#, UniRx for C#(Unity), RxScala for Scala, RxClojure for Clojure, RxCpp for C++, Rx.rb for Ruby, RxPY for Python, RxGroovy for Groovy, RxJRuby for JRuby, RxKotlin for Kotlin, RxSwift for Swift and the like. Alternatively, the reactive programming paradigm can also be implemented without using the RX technology. Each state is thus analyzed through a set of conditions and a corresponding action is performed whenever the condition matches.

In particular, the present disclosure relates to state abstraction, observed state and state observers (observers are associated with first data processing device's test framework executing the tests)). The state abstraction makes easier to apply reactive programming to test scripts. Further, the state or a part of it is observed as a collection of objects. Furthermore, each object with its attributes represents an aspect of the tested system, for example, it can be at least one of a user-interface component on a device view, and a parameter describing a property of the test system and its surrounding environment. In an instance, it can be the debugging data of the tested system.

A software based system can represent its state in a supported format, for example, an XML or JSON document describing the user-interface elements. A common interface to access device state is result of abstraction and it is specific to the test framework. Optionally, the test framework is capable of reacting to an observed state with predefined logic when the observed state contains predefined properties. Additionally, optionally, the reacting based on the observed state comprises the action to be executed by the first data processing device. Further, each change in the state is send via an abstraction module to the test framework (described later in conjunction with figures). In an embodiment, at least one of the state, a part of it and both can be observable. Further, the abstraction result can be applied to software design pattern referred to as observer pattern.

In an embodiment, the tested system's state or part of it is requested by test execution logic. Alternatively, the state or a part of it is automatically updated when the tested systems state changes. In each instances, when the state changes, the change is notified to observers running on data processing device's test framework. The device ability to notify the state changes depends on the system under test or user agent running on the system under test.

Observers associated with the first data processing device's test framework follows updates on the observed state or a part of it. Further, the observers associated with the first data processing device's test framework fulfils two parts, comprising a condition and an action. The condition needs to match to an observed test systems state to execute the action associated with observer. In an embodiment, each time when the test system state changes, the observers associated with first data processing device' test framework perform an action defined in it. Further, the condition can also be in the action itself. In an embodiment, the action can be, for example, a snippet of the test execution logic. The observers associated with the data processing device's test framework defines whether the action is executed once or multiple times. For example, if the condition matches on different occasions during the test execution, then the action is launched each time. Further, the observers associated with first data processing device's test framework are subscribed from test execution context, for example, from a test script. The observers associated with the first data processing device's test framework can be unsubscribed automatically after the action is executed. Alternatively, the observers associated with the first data processing device's test framework remain in memory for next occurrence of the state that matches with the condition defined.

In an embodiment, the actions corresponding to the observers associated with the first data processing device's test framework are executed on a separate thread. Alternatively, the actions corresponding to the observers associated with first data processing device's test framework are executed on the same thread where the test execution logic is being executed. Further, depending on the functionality, the thread runs parallel or interrupts the test execution logic. According to one embodiment, given that the observers associated with the first data processing device's test framework and its action are executed in its own thread and the purpose of the observers associated with the first data processing device's test framework and its action is to react to some unexpected situation in order the test execution logic can continue. In such instance, the test framework has to pause, prevent or wait in the thread processing the test execution logic and run the thread where the actions corresponding to the observers associated with the first data processing device's test framework is executed. After the thread executing observers action has finished, the thread processing the test execution logic can continue. In an embodiment, other observers associated in first data processing device's test execution framework are not allowed to run during the time an action corresponding to a observers action is being executed.

According to another embodiment, given that the observer associated with the first data processing device's test framework and its action is executed on separate thread and its purpose is not to execute anything that might interfere with the test execution logic. In such instance, the thread executing the test execution logic can continue while the thread of the first data processing devices test framework's action is being executed in parallel. This type of action is allowed to execute during the time actions corresponding to first data processing device's test is being executed.

The state abstraction defines that the test framework needs to implement an abstraction module which hides implementation details of the tested system to a format which is specific to the test framework. This also provides the tested system state to test execution context. The abstraction of the tested systems state can be achieved with data deserialization. In an embodiment, the tested systems state representation can be, for example XML, binary XML or JSON document, or any other kind of data which is supported in the tested environment. The Deserialization result is an object that provides functionality to implement observable pattern. The state and its attributes are brought to test framework level as objects specific to the language are used to implement the test framework.

Further, the notifications are generated based on state change. The way the state changes, is notified and can be implemented using at least one of reactive programming paradigm, events, callbacks or using simple function. In an embodiment, the changed state or its reference can be delivered within the notification. Alternatively, the changed state can be fetched when the notification has been received by the observers associated with the at least one of second data processing devices. Alternatively to notification, each condition of observer associated with the first data processing system's test framework are checked one by one that do they match to observed state.

In an embodiment, the present disclosure relates to observing a state of the software based system when the collected data is executed by a first data processing device, and reacting based on the observed state, when the observed state matches a predefined state or part of it, by the first data processing device's test framework. The reaction based on the observed state comprises an action to be executed by the first data processing device's test framework. This is explained in conjunction with subsequent figures.

Figure 7:
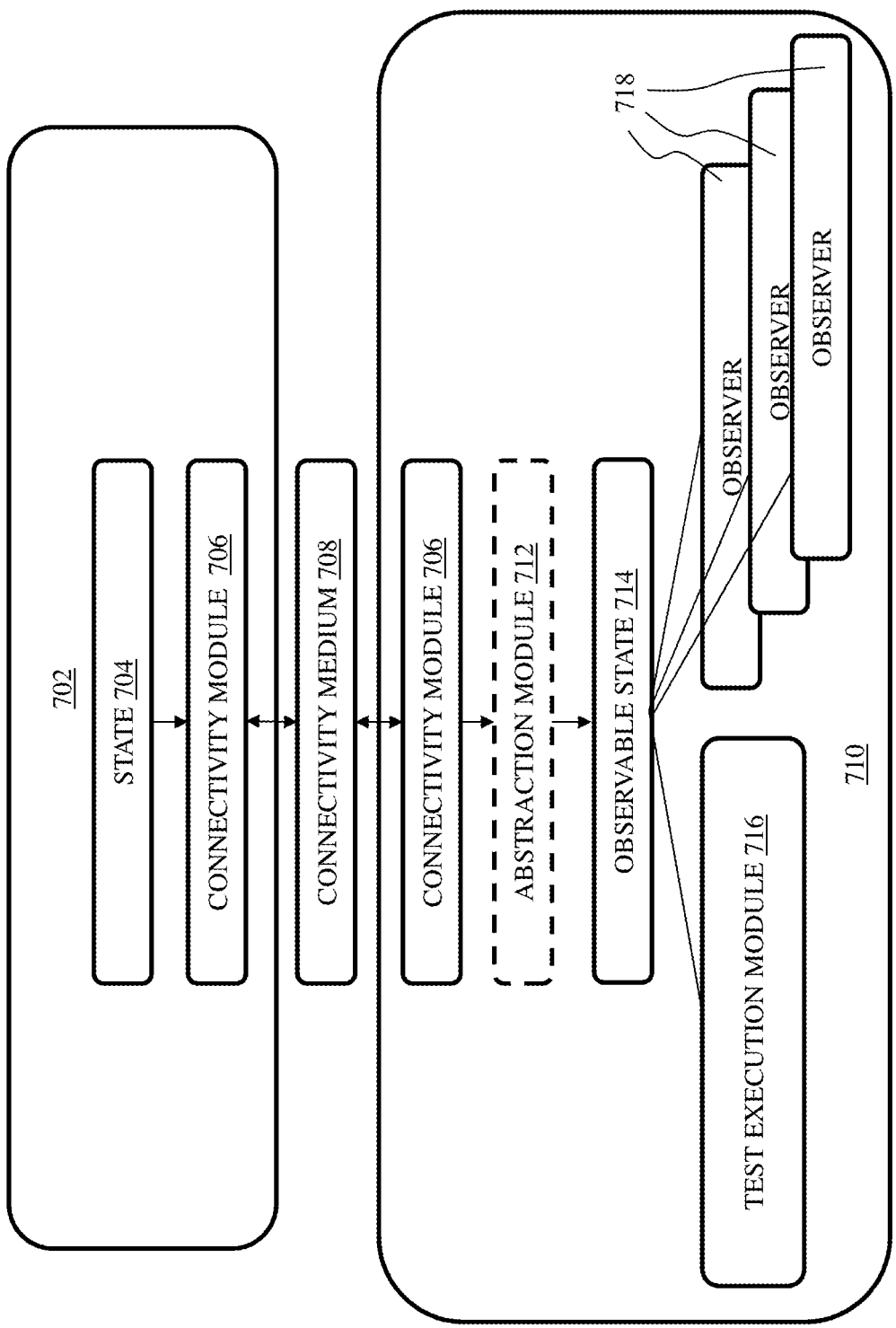
FIG. 7 is an illustration of a first data processing device receiving information of state of a software based system and reacting to it, in accordance with an embodiment of the present disclosure.

Now referring to FIG. 7, illustrated is a device under test/system under test 702 providing information of state (or part of it), in accordance with an embodiment of the present disclosure. In an embodiment, the state 704 the software system under test (this refers to system, component or device running a software) 702 is requested directly. Alternatively, the system under test 702 may run a connectivity module 706 to provide access to the state 704. Further, the state 704 is transferred via a connectivity medium 708. Additionally, the system under test 702 may be capable of pushing changes in the state 704 via the connectivity medium 708 to test a framework 710. The connectivity medium 708 includes but may not be limited to a serial data connection, Universal serial bus (USB), Bluetooth and Wireless local area network (WLAN).

The state 704 acquired from system under test 702 is received by the test framework 710 and processed via an abstraction module 712. Specifically, the state is observed when the collected data is executed by the first data processing device 702 (by abstraction module 712 of the first data processing device).

In an embodiment, the abstraction module 712 is specific to the system under test 702. An actual result of the abstraction by the abstraction module 712 is an observable state 714. In an embodiment, the abstraction is not a necessary step, for example, the observable state 714 can be in a format provided by the first data processing device 702. Further, the observable state 714 is used by a test execution module 717 for proceeding with the test execution. The abstraction module 712 also implements functionality to notify observers 718 associated with the first data processing device's test framework whenever the state 704 changes. Alternatively, the observers 718 associated with the first data processing device's test framework may be notified using a separate module, for example, a notification module.

Figure 8:
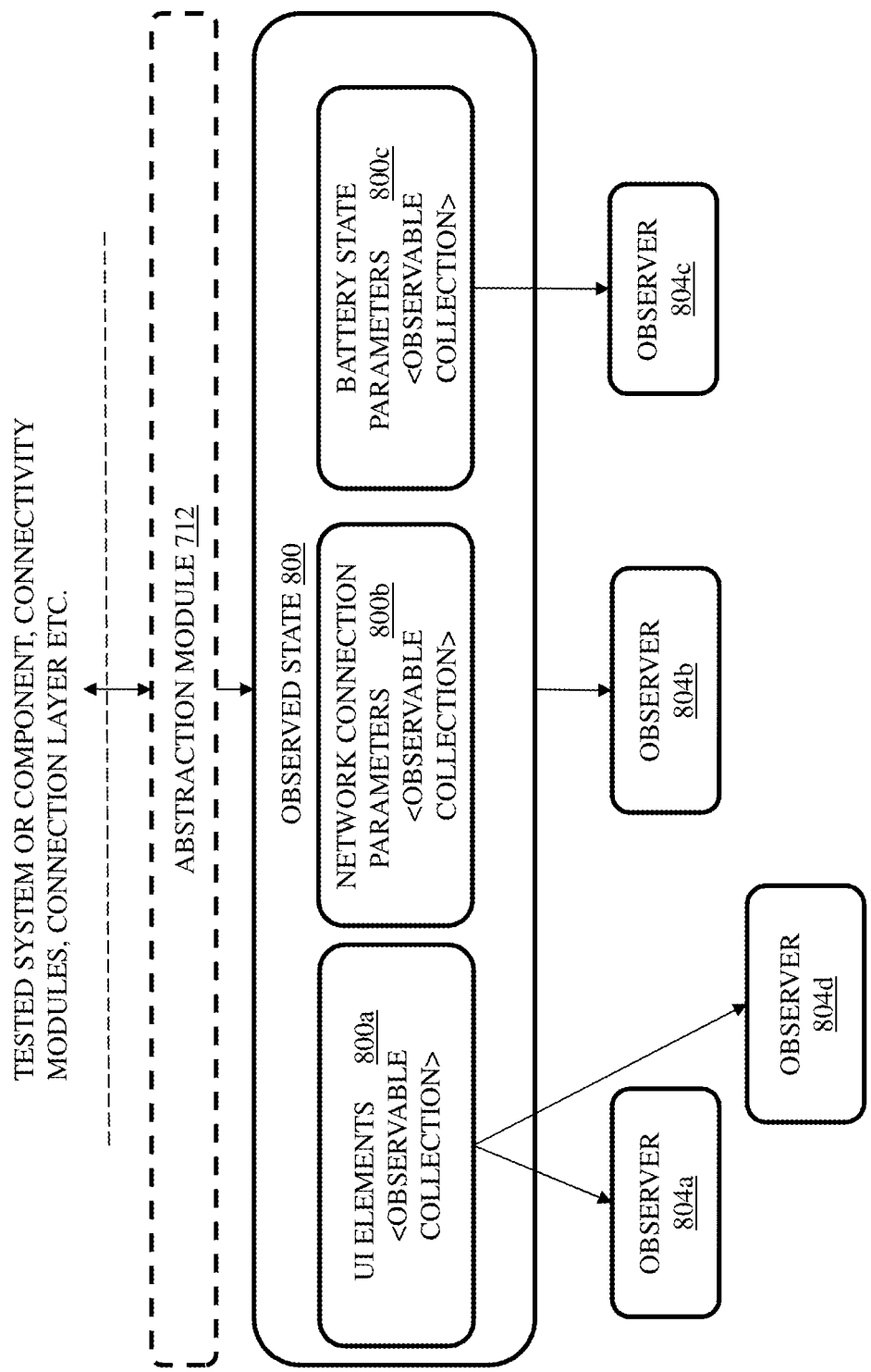
FIG. 8 is an illustration of an example implementation of an observed state in user-interface test automation, in accordance with an embodiment of the present disclosure.

Referring now to FIG. 8, illustrated is an example implementation of an observed state in user-interface test automation, in accordance with an embodiment of the present disclosure. The abstraction module 712 (shown in FIG. 7) receives the state 704 (shown in FIG. 7) and converts it to an observed state 800. The observed state 800 includes state attributes user-interface elements 800a, network connection parameters 800b and battery state parameters 800c. The observer associated with the first data processing device's test framework subscribes to listen the changes, such as, observers 804a and 804d are subscribed to changes which happen in the user-interface elements collection, observer 804b is subscribed to changes which happen in any of the attributes (for example, user-interface elements, network connection parameters and battery state parameters), and 804c is subscribed to changes which happen in the tested systems battery state. The user-interface elements refer to user interface and the objects in it. In an embodiment, the abstraction module 712 provides a single object, which is observable collection of the user-interface elements of the tested systems user interface. Further, the notifying functionality can be implemented without using observable collections. In such instance, the state is received from the tested system and thereafter analyzed before it is delivered to test execution context. A state analyzer checks each observer whether the condition matches and thus makes the decision for executing the action corresponding to the observer.

Figure 9:
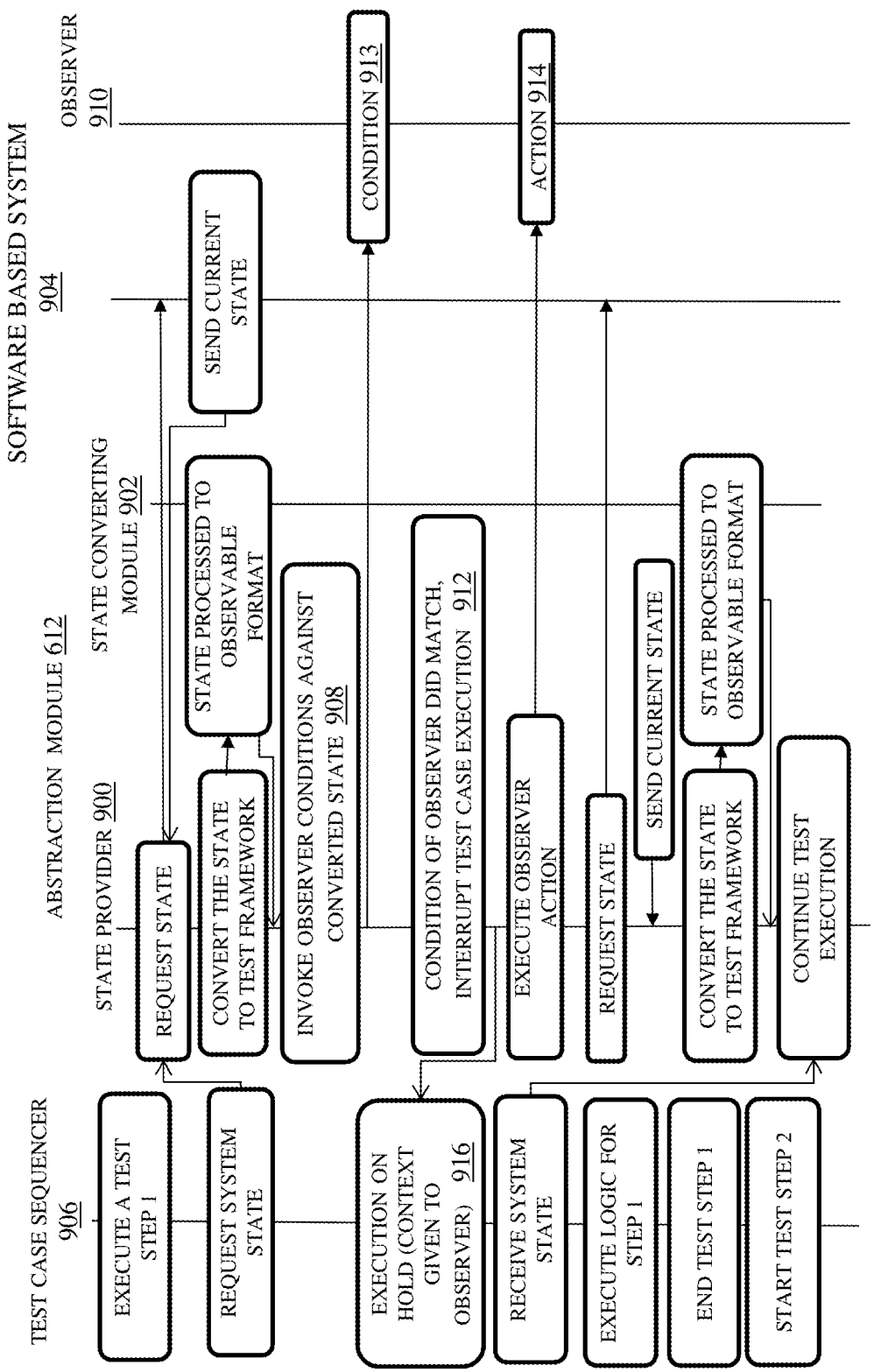
FIG. 9 is an illustration of an example implementation of a sequence diagram for multi-threaded test execution, in accordance with an embodiment of the present disclosure.

Referring now to FIG. 9, illustrated is an example implementation of a sequence diagram for multi-threaded execution of test execution logic and observer action, in accordance with an embodiment of the present disclosure. In an embodiment, the state is pull based, for example, the system under test does not have the capability to notify that the state has changed. The state abstraction comprises a state provider module 900 and a state converting module 902. The test execution context requests the state from the state provider module 900, which handles the query of the state from a software based system (i.e from the device under test) 904 and its converting is done with the state converting module 902.

A test case sequencer or runtime 906 executes the test case. The state is requested from the state provider module 900. Further, before the state provider module 900 provides the state to the test case sequencer 906 for test step execution, the state provider module 900 invokes condition 913 associated with the observer 910 to check whether the observer's 910 action 914 should be launched. In an example, the condition matches, so that the test case sequencer 906 does not get the execution context for the time observer's action 914 is executed, the test case execution is put on hold 916.

The state provider module 900 gives execution for state observer 910 and it's action. After the action has executed, the state is refreshed from the software based system 904 and the test execution context is given back to the test case sequencer 906. If the system state is a push based, i.e. the system under test has the capability to notify that the state has changed, then the abstraction module 712 with device state provider keeps receiving the state changes from the software based system 904 constantly, even when the observer's 910 action 914 is under execution. In this regard, the observable state needs to have logic whether to interrupt the currently executing observer or disallow other observers' actions running for the time the first observer's action is under execution. In single threaded environment, the implementation is simpler. The conditions and actions are executed within the same thread as where the test execution happens so there is no need to stop the test execution during the execution of the observer action.

Optionally, the present disclosure relates to naming the observers (observer 710). In order to unsubscribe certain observer from observed state, either the reference needs to be kept to observer in the test execution context or the observers should be named. The naming can be simply a text string and the execution of the observer action can print this name before the action is executed. The text string can be send for observed state for renewing or unsubscribing purposes.

Optionally, the present disclosure relates to renewing the observer. The observers can be renewed, for example, if the observer action function has changed, the changes can be detected for example, with a file system watcher. Whenever there are changes, the file system watcher reloads the state observer action accordingly. The renewal can also be done from the test execution context using the same way as initial subscription.

Optionally, the present disclosure relates to loading state observers from the test framework. The test framework can have test set configuration possibility and test cases can be parameterized by configuring test set or tests. By parameterization, the cases can be set to load the observers for each test case as per configuration.

Optionally, the present disclosure relates to unsubscribing state observers. The state observers can be set to remain within execution, for example, until its action has been executed, until test case is finished, until test set execution ends, until test framework is closed and until the tested system is restarted. The unsubscribing can also be done within the state observer action. For example, if some situation has been verified and the state observer is no longer needed, it can unsubscribe from the observed state.

Optionally, the present disclosure relates to observers. The architecture can be designed also so that the state observing condition is checked in the first data processing device 702. The system can launch pre-defined action autonomously or notify test framework that it needs to execute the action defined by state observer.

Optionally, the present disclosure relates to executing state observers in sequence. When the observer is set not to disable after execution, the action might be initiated multiple times. To overcome this, the state needs to be refreshed after the action for test execution context without executing the action immediately after it has been just finished.

The abstraction module 712 which is handling the state observers' actions execution can be designed to detect situations where the same action if looped again. Thus, scenario where the test execution cannot continue since the state observer actions are looped can be prevented.

Optionally, the present disclosure relates to prioritizing the state observers. In case there are multiple state observers observing the devices state (or part of it), the order of the execution can be prioritized. In this scenario, there needs to be a way to define the priority of the state observer, for example, it can be categorized and the implementation of the observable state takes care of the priority and order in which the state observers are executed. The state observing can be applied to debug data. Simplest version of the functionality can be achieved by passing each debug log entry to a method containing the condition logic whether certain action is launched.

Optionally, the present disclosure relates to subscribing to the observed state. The subscribing/unsubscribing with the state observers to the observed state can be done either from within the test execution logic (setup, teardown or actual test case phase) or other user controllable way, for example, via a GUI component.

Optionally, the present disclosure relates to data formats. The data structures and formats moving between modules (for example, connectivity medium and module 708, 706, abstraction module 712 and observer 910) are not relevant regarding the invention. These are most often specific to the language used to implement the modules.

In an example, when the tested system is a device consisting of various applications and components, any of the components might be interrupting testing preventing execution of predefined execution logic. For example, if the tested system is a mobile phone and its call application crashes for some reason during testing of the browser application, it might be that the browser test does not have anything to do with the call application. But the call application is interrupting the testing by displaying a dialog "Call application has crashed" along with "OK" and "Report" buttons. In manual testing, this can be handled easily by pressing either button of the dialog and by continuing the browser test case. When this test is conducted automatically, an observer is defined that it will react on text "Call application has crashed". The action of the observer is to press "OK" button. The dialog is then cleared and the test steps of browser test case can continue successfully.

In an embodiment, the software test automation and its test cases consists of sequence of calls to the software based system. The calls interact with the tested system by sending commands and receiving and analyzing data coming from the tested system. These calls form a scripting library method or function as building blocks of the scripting library. This is equivalent to software programs that consist of functions that can be used to construct other functions, for example, structured programming paradigm. In an embodiment, the scripting library is a set of commands that is used to form test cases.

The present disclosure further relates to mapping and overriding of a scripting library in test automation. In an embodiment, the testing is conducted on at least two software based system, which require different input, to reach equivalent output. In this regard, i.e. for automatic test execution, two separate test scripts are required. Further, when test scripting library mapping is done, keywords and actions (e.g. methods) are loaded automatically and the path to the scripting library overrides is selected manually. Alternatively, the path of the overriding scripting library methods can be determined automatically by reading properties from tested system and by defining configuration which can be used to define a property or a set of properties needed to match to the properties of the software based system 904 (shown in FIG. 9).

In an embodiment, keyword based approach is used to adapt from the test script level to the possible changes in the software based system 904 (shown in FIG. 9). In this regard, for executing the test scripts for the software based system 904 (shown in FIG. 9), a loader module for loading the scripting methods is required. Further, abstraction of the software based system 904 is a software object instance which provides access to scripting methods available in test execution context. The loader module is operable to load scripting methods (e.g. keywords) from given path, attach scripting methods to abstraction of the software based system 904 for use in the test execution context and override existing scripting methods in the software based device 904 scripting library if the method name is same for the overriding method. Optionally, the loader module is operable to read configuration file that defines at least one property which is used to map a scripting library location to the software based system 904.

Specifically, the present disclosure further relates to selection of a scripting library (or a part of it), to conduct actions on the software based system 904, based on a parameter read from the software based system. Further, the present disclosure further relates to overriding the existing scripting library and creating a new scripting library. This is explained in conjunction with subsequent figures.

Figure 10:
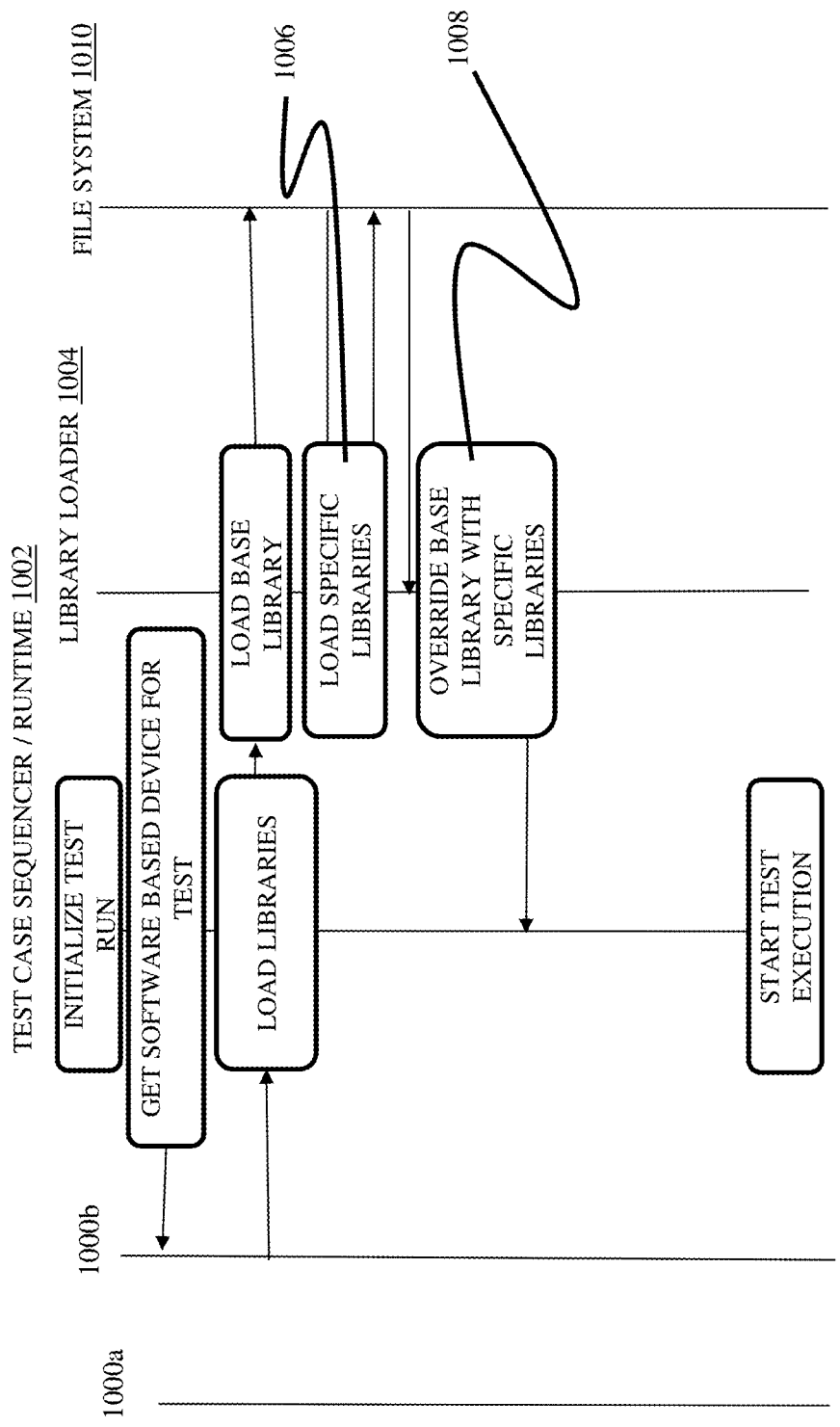
FIG. 10 is an example illustration of a sequence diagram of library loading, in accordance with an embodiment of the present disclosure.

Referring now to FIG. 10, illustrated is an example illustration of a sequence diagram of library loading, in accordance with an embodiment of the present disclosure. A test case sequencer or runtime 1002 initializes the test run for the software based system 1000a-b. Further, a library loader 1004 first loads the base library for the software based system 1000a-b, for example, a general library for accessing the software based system 1000a-b. Thereafter, the library loader 1004 loads the software based system specific libraries 1006 and overrides 1008 the libraries already loaded within the base library for the part defined in the software based system specific libraries 1006 and creates any new library methods for accessing from the test execution context. The path that library loader uses is provided by the test case sequencer or runtime 1002.

In an embodiment, the test framework is operable to provide available scripting library methods to the context of the test case script, for example, the script or test code can control the software based systems 1000a-b. In an embodiment, the actual implementation may vary and this disclosure describes an example architecture and method thereof.

The first data processing device creates an instance of an interface that abstracts the software based systems 1000a-b. The instance exposes methods to access the software based systems 1000a-b and its properties. The properties are important regarding the automatic mapping functionality in the loader module (the library loader 1004). The loader module uses the properties read from the abstraction of the software based system 1000a-b and the information about available paths of the scripting library overrides. The library loader 1004 functionality can be a part of the test automation framework. Whenever loading of the script library is made, the library loader 1004 functionality loads available scripting library overrides from the location that is specified in settings or in the abstraction of the software based systems 1000a-b. Usually, this location is a file path. If a scripting library method is already found from the abstraction of the software based systems 1000a-b, it gets replaced by the library loader 1004 with the override. If abstraction does not include the method, then, a new method (keyword) is created for use in test execution context.

Figure 11:
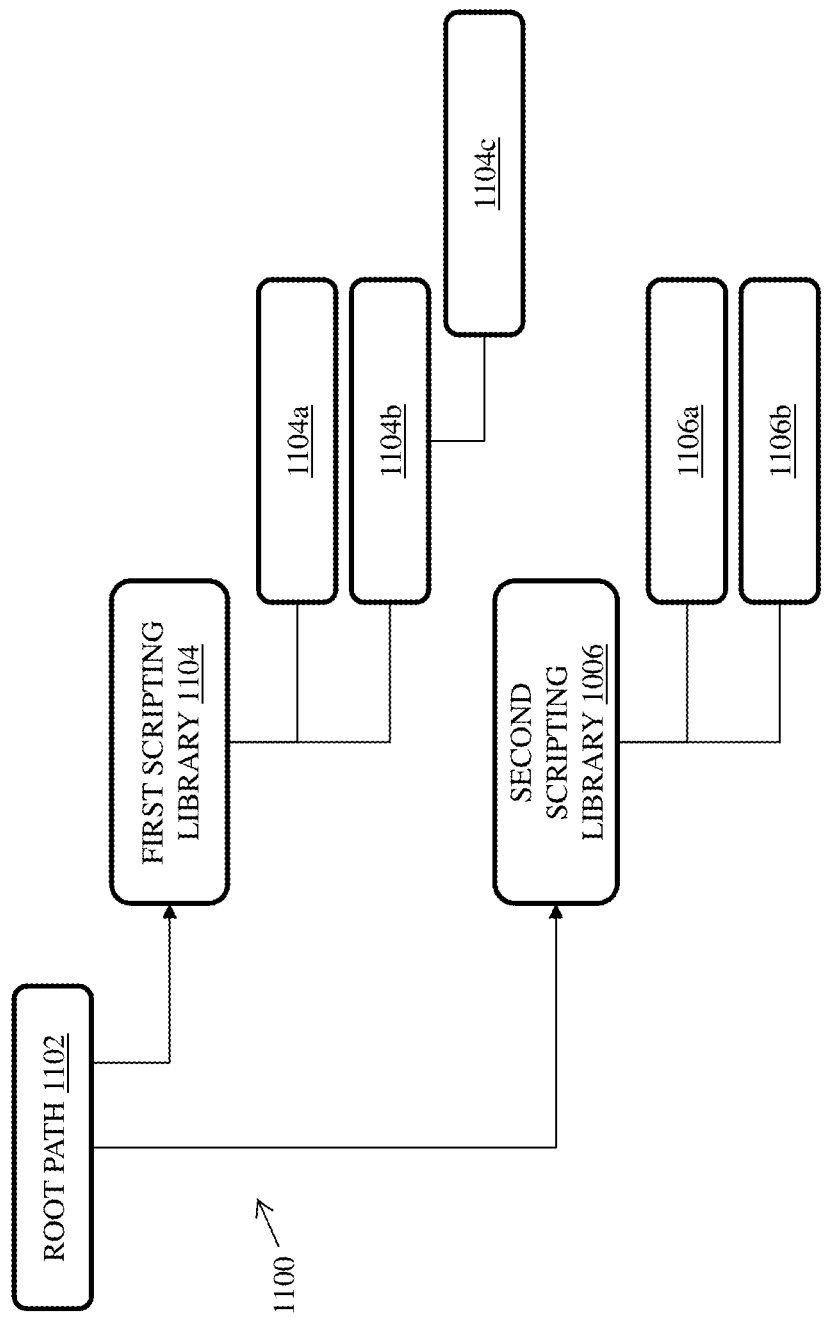
FIG. 11 is an illustration of a hierarchical loading method, in accordance with an embodiment of the present disclosure.

Optionally, the way the scripting library methods and their overrides are brought to the test execution context can vary. Some frameworks load the scripting library methods directly to the context of the test case, some provide them via an instance of object abstracting the software based systems 1000a-b. Further, the scripting library overrides are loaded and attached to the test execution context before the test case execution happens. Alternatively, a file system 1010 can be used, for example, whenever the scripting library methods or overrides change, the method loading functionality is executed. This allows the loading and taking changes into use immediately when the file describing the override or the scripting library methods change. Optionally, the method comprises selecting a location of the scripting library definitions, extensions and overrides, automatically or manually. Referring now to FIG. 11, illustrated is a hierarchical loading method 1100, in accordance with an embodiment of the present disclosure. A root path 1102 comprises two libraries, such as a first scripting library 1104 and a second scripting library 1106. Each of the libraries defines a set of methods specific for the software based system, such any of the software based systems 1000a-b. These methods override possible base library as new methods in the test execution context.

As shown, under the first scripting library 1104, there are two libraries: 1104a and 1104b. These are loaded after the first scripting library 1104 is loaded. For example, the 1104a library method definitions again override the methods defined in the first scripting library 1104. The same approach can go deeper: library 1104c is overriding any 1104a and 1104b library methods.

In an example, a test case is created using base scripting library and overrides defined in first scripting library 1104. The implementation of the test case is created using the keyword based approach. Each keyword is written for the first scripting library 1104. Further, the keywords are implemented for the second scripting library 1106. Configuration for the second scripting library 1106 is defined so that the library location (for example path in file system) is determined either manually or automatically by reading the properties of the second scripting library 1106 and comparing them to properties read from system under test (1000b). When the test case is started for the second scripting library 1106, the system selects the methods (e.g. keywords) from location specified by the second scripting library 1106 configuration. As shown, under the second scripting library 1106, there are two libraries: 1106a and 1106b.

Furthermore, optionally, the present disclosure relates to recording the test execution with a video capturing device. Optionally, the video, of the software based system is captured to identify a freeze condition of the software based system. Optionally, the identification of the freeze conditions is determined by analyzing the video frames of the in the software based system, such as one of the software based systems 1000a-b. This is performed by a video recording and freeze detection system. These modules are controlled by the test framework handling the test case execution. A video capturing module is operable to perform video recording. The video capturing module comprises a capturing source, which can be either an internal or external video camera device. Alternatively, the capturing source can be a software based video source. Further, the video capturing module comprises a software which controls the capturing source and performs the freeze detection method. The video recording starts when the test execution starts. The freeze detection functionality of the system is based on analyzing video frames received from the video source and measuring how much the video frames have changed during the test case execution. If the video frames change during the execution, there is no freeze condition determined. If the frames are determined not to contain changes, then there is possibly a freeze condition. The change detection mechanism is adjustable with a threshold, for example, how much the video frames need to differ in order to be determined as a change. This is now explained in conjunction with subsequent figure.

Figure 12:
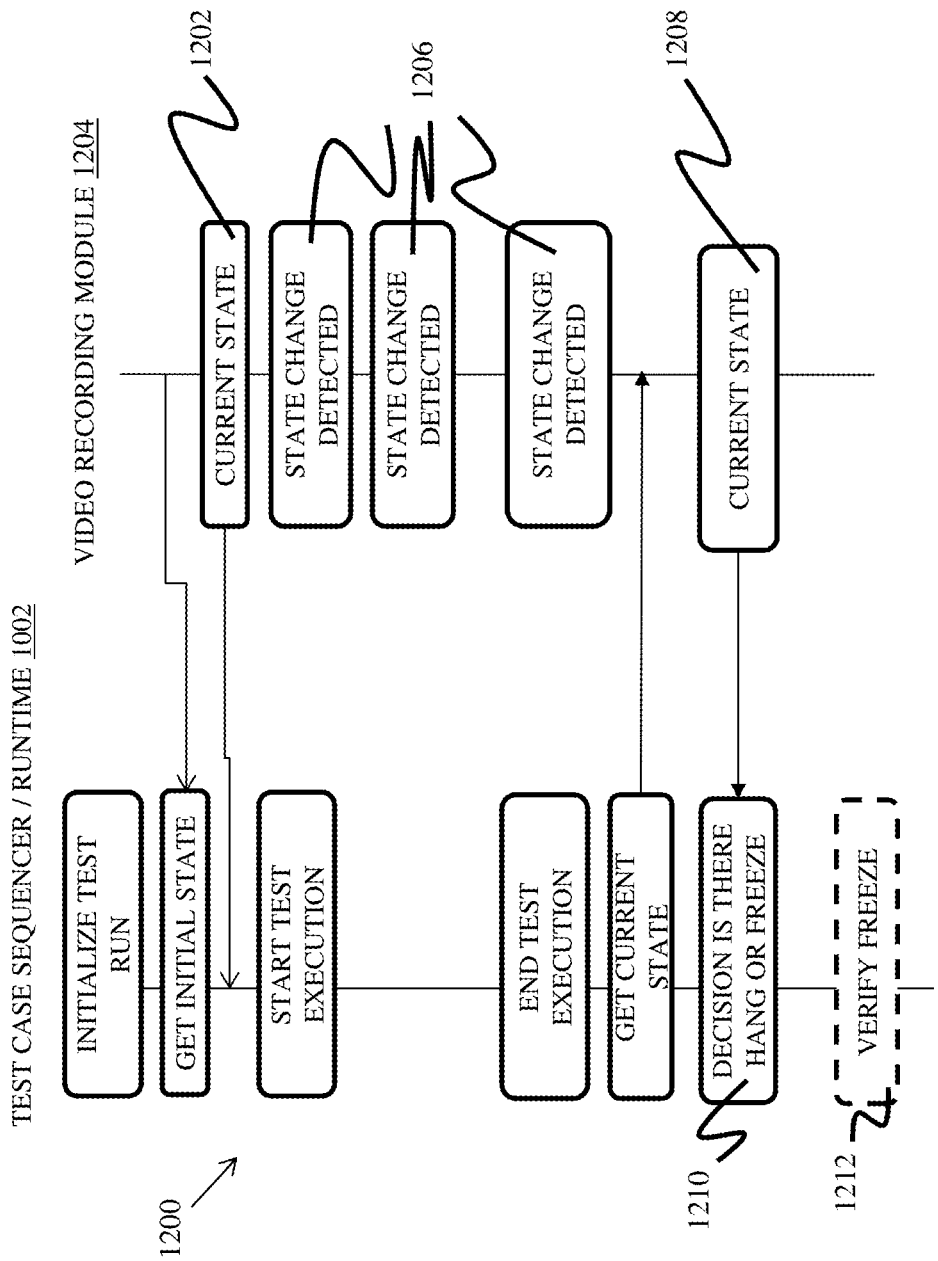
FIG. 12 is an example illustration of a sequence diagram of a freeze detection mechanism, in accordance with an embodiment of the present disclosure.

Referring to FIG. 12, illustrated is an example illustration of a sequence diagram 1200 of the freeze detection mechanism. The test run is initialized and before executing test steps, a current state 1202 is requested from a video recording module 1204. During the test execution, there are changes 1206 detected in the video stream. After the execution has finished, the state is asked from the video recording module 1204. The current state 1208 is not equal since there are changes detected during the execution and therefore decision 1210 can be evaluated that there is no freeze condition. In an embodiment, "current state" can be any state that can be used to determine if the video has changed. For example, it can be just a value describing that how many times the video frame has changed.

If the state changes 1206 are missing, then the decision 1210 shows that there is a freeze condition detected and a freeze condition verification method 1212 is launched. The freeze condition verification method 1212 uses the video recording module to determine whether there are changes in the state during the verification.

In an instance, the test case runtime is responsible for determining the freeze condition and the video recording module is a dummy data provider. Further, the video recording module is responsible for determining the freeze condition. The test case sequencer needs to inform the video recording module when the test case starts and after the execution, verifies that if there has been changes in the captured video stream. Optionally, the video frames can be analyzed partially, for example, the whole captured video frame does not need to be under analysis.

Referring to FIG. 13, illustrated is a device observer interface 1300 provided on a first data processing device (for example, such as the first data processing device 404 of FIG. 4), in accordance with an embodiment of the present disclosure. As shown, the device observer interface 1300 includes an exemplary test run explorer that includes clickable tabs such as 'Test Sets', 'Test Results', 'Test Run Reports', 'Screen Contents History', and the like. As shown, the test engineer associated with the first data processing device clicks on clickable tabs 'Device Log', 'Execution Log', and 'Video' to open three dockable windows corresponding thereto. In the 'Device Log' dockable window, there is shown a unique ID, a unique timestamp, and data source corresponding to each data item. Furthermore, in the 'Execution Log' dockable window, there is shown a unique ID, a unique timestamp, and decryption corresponding to each action item. In the 'Video' dockable window, there is shown a video frame of the software based system under test. Furthermore, in the device observer interface 1300, the test engineer associated with the first data processing device may click on any data item within an opened dockable window, and the data items in other open dockable windows becomes synchronised in time with the clicked data item. As an example, the test engineer may click on any data item, such as the data item having ID 3744190 in 'Device Log' dockable window, and consequently, data in the other dockable windows becomes synchronised in time with the clicked data item. Term "device observer interface" can refer to "data observer interface" since the interface is used to monitor any data. In general logs can be implemented as text format logs anc comprise the log text, time stamps, information of the data source and type of the log marking (warning, error, info etc). In general each data type might contain, in addition to the data related to the type, time stamps. The time stamps are used to synchronize two or more of the data of the data types in respect to each others"

Figure 14:

Referring to FIG. 14, illustrated is a device observer interface 1400 provided on a first data processing device (for example, such as the first data processing device 404 of FIG. 4), in accordance with an embodiment of the present disclosure. The device observer interface 1400 includes the exemplary test run explorer depicted in FIG. 13. However, as shown, the device observer interface 1400 includes data items corresponding to a different date and time as compared to the device observer interface 1300. Furthermore, in the device observer interface 1400, the test engineer associated with the first data processing device may click on any data item within an opened dockable window, and the data items in other open dockable windows becomes synchronised in time with the clicked data item. As an example, the test engineer may click on any data item, such as the data item having ID 4254155 in 'Device Log' dockable window, and consequently, data in the other dockable windows becomes synchronised in time with the clicked data item.

Referring to FIG. 15, illustrated is a device observer interface 1500 provided on a first data processing device (for example, such as the first data processing device 404 of FIG. 4), in accordance with an embodiment of the present disclosure. The device observer interface 1500 includes the exemplary test run explorer depicted in FIGS. 13 and 14. As shown, the test engineer associated with the first data processing device clicks on a clickable tab 'Alerts' to open a dockable window corresponding thereto. Furthermore, in the 'Alerts' dockable window, there is shown a plurality of alerts describing anomalies in operation of the software based system under test. As an example, an alert 'Possible view leak in Application 'X'' may be selected by the test engineer associated with the first data processing device to obtain more information regarding thereto.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for testing a software based system, the method comprising:
   collecting data from the software based system under test by a first data processing device associated with a first user;
   virtualizing and timestamping the collected data by the first data processing device, the first data processing device being configured to virtualize the collected data by indexing and organizing the collected data for access by the first user;
   abstracting data storage type and data storage location of the collected data by the first data processing device by masking the data storage type and the data storage location of the collected data;
   broadcasting the virtualized and timestamped data to at least one second data processing device;
   automatically comparing the collected data to one or more of previously collected data or a pre-defined condition by the first data processing device;
   reacting to the comparing of the collected data at its location with an action carried out locally by at least one second data processing device by one or more of executing a pre-written script of test steps on the collected data or by sending communication pertaining to the action to the first data processing device from the at least one second data processing device; and
   updating execution of the test based upon the action.

2. The method according to claim 1, wherein the virtualization of the collected data comprises indexing the collected data.

3. The method according to claim 1, wherein a data view on a data processing device having data items, when clicked, sends a timestamp associated with clicked data to at least one other data view on the same data processing device.

4. The method according to claim 1, wherein the broadcasting comprises at least one of:
   sending the virtualized and timestamped data using multicast protocols to the at least one second data processing device,
   sending a uniform resource locator related to the virtualized and timestamped data to least one second data processing device.

5. The method according to claim 1, wherein the reaction based on the observed comparison result obtained comprises the action to be executed by the first data processing device and/or the server.

6. The method according to claim 1, wherein the reaction based on the received data comprises an action to be executed by the at least one second data processing device.

7. The method according to claim 1, wherein a test framework is capable of reacting to an observed state with predefined logic when the observed state contains predefined properties.

8. The method according to claim 1, wherein the reacting based on the observed state comprises the action to be executed by the first data processing device.

9. The method according to claim 1, further comprising defining, extending and overriding a scripting library, to conduct actions on the software based system.

10. The method according to claim 9, further comprising selecting a location of the scripting library definitions, extensions and overrides, automatically or manually.

11. The method according to claim 1, further comprising capturing a video, of the software based system, for identifying a freeze condition of the software based system.

12. The method according to claim 11, wherein the identification of the freeze condition is determined by analyzing video frames of the software based system.

13. A system for testing a software based system, the system comprising:
a first data processing device configured to
collect data associated with the software based system under test;
virtualize and timestamp the collected data the first data processing device being configured to virtualize the collected data by indexing and organizing the collected data for access;
abstract data storage type and data storage location of the collected data by masking the data storage type and the data storage location of the collected data;
broadcast the virtualized and timestamped data to at least one second data processing device;
comparing the collected data to one or more of previously collected data or a pre-defined condition
the at least one second data processing device communicably coupled to the first data processing device;
wherein the first data processing device is configured to react to the comparing of the collected data at its location with an action carried out locally by one or more of executing a pre-written script of test steps on the collected data or the at least one second data processing device is configured to send communication pertaining to the action to the first data processing device, and wherein the first data processing device and/or the at least one second data processing device is configured to update execution of the test based upon the action.

14. The system according to claim 13, further comprising a server communicably coupled to the first data processing device and the at least one second data processing device, wherein the server is configured to collect the virtualized and timestamped data transmitted from the first data processing device, and transmit the virtualized and timestamped data to the at least one second data processing device.

15. The system according to claim 14, wherein the server comprises a database, and wherein the database is configured to store the virtualized and timestamped data.

16. The system according to claim 14, wherein the server is configured to react to the collected data at its location by way of executing the action.

17. The method according to claim 12 wherein at least two video frames of the software based system are compared to identify the freeze condition in the software based system.

18. The method according to claim 1, wherein the method further comprises, between virtualizing and broadcasting, observing a state of the software based system from its data, and reacting to the collected data at its location with an action carried out locally by the entity reacting or by sending an action to the first data processing device when the entity reacting is different from the first data processing device.

* * * * *